United States Patent [19]

Lyons

[11] Patent Number: 4,694,337

[45] Date of Patent: Sep. 15, 1987

[54] VIDEO LINE RATE CONVERTER

[75] Inventor: David J. Lyons, Trenton, N.J.

[73] Assignee: Princeton Electronics Products, Inc., North Brunswick, N.J.

[21] Appl. No.: 821,850

[22] Filed: Jan. 23, 1986

[51] Int. Cl.$^4$ ............................................. H04N 7/01
[52] U.S. Cl. ...................................... 358/140; 358/11; 358/12; 358/141
[58] Field of Search ..................... 358/11, 12, 140, 141

[56] References Cited

U.S. PATENT DOCUMENTS 4,587,556  5/1986  Collins ................................. 358/140

FOREIGN PATENT DOCUMENTS 0003182  7/1979  European Pat. Off. ............ 358/140

OTHER PUBLICATIONS

International Conference on Communications; "A Digital Standards-Converter for Television Using Intra--Frame Line Interpolation Techniques", by Kinuhata et al; Jun. 17-19, 1974, pp. 7C-1 to 7C-5.

*Primary Examiner*—James J. Groody
*Assistant Examiner*—Michael D. Parker
*Attorney, Agent, or Firm*—Ostrolenk, Faber, Gerb & Soffen

[57] ABSTRACT

A method and apparatus for converting an input video signal having P input lines, P being an integer much greater than one, into an output video signal having Q output lines, Q being an integer much greater than one but different than P. The conversion is preferably carried out using a linear interpolation method wherein the video information in the input signal is evenly distributed throughout the video output signal. The input lines are stored in small groups of M input lines and the output signal is generated in groups of N output lines. Each group of output lines is generated shortly after the receipt of an associated group of input lines.

31 Claims, 24 Drawing Figures

$$F_q(1) = 3/5 \left[ F_p(1) + 2/3 \, F_p(2) \right]$$
$$F_q(2) = 3/5 \left[ 1/3 \, F_p(2) + F_p(3) + 1/3 \, F_p(4) \right]$$
$$F_q(3) = 3/5 \left[ 2/3 \, F_p(4) + F_p(5) \right]$$
$$F_q(4) = 3/5 \left[ F_p(6) + 2/3 \, F_p(7) \right]$$
$$F_q(5) = 3/5 \left[ 1/3 \, F_p(7) + F_p(8) + 1/3 \, F_p(9) \right]$$
$$F_q(6) = 3/5 \left[ 2/3 \, F_p(9) + F_p(10) \right]$$

$F_g(1) = 3/5 [F_p(1) + 2/3 F_p(2)]$
$F_g(2) = 3/5 [1/3 F_p(2) + F_p(3) + 1/3 F_p(4)]$
$F_g(3) = 3/5 [2/3 F_p(4) + F_p(5)]$
$F_g(4) = 3/5 [F_p(6) + 2/3 F_p(7)]$
$F_g(5) = 3/5 [1/3 F_p(7) + F_p(8) + 1/3 F_p(9)]$
$F_g(6) = 3/5 [2/3 F_p(9) + F_p(10)]$

| OUTPUT LINE | $1/EN(R)$ | $1/EN(R)$ | $Ka(R)$ | $Kb(R)$ | $Kc(R)$ | $Kd(R)$ | $Wx(R)$ | $Rx(R)$ | $Wx1(R)$ | $Rx1(R)$ |
|---|---|---|---|---|---|---|---|---|---|---|
| 1 | 1 | 1 | 0 | 1 | 1 | 0 | 0 | 1 | 1 | 0 |
| 2 | 1 | 1 | 2/3 | 1/3 | 2/3 | 1/3 | 1 | 1 | 1 | 0 |
| 3 | 1 | 0 | 0 | 1 | 0 | 0 | 0 | 0 | 0 | 1 |
| 4 | 1 | 1 | 0 | 1 | 1 | 0 | 0 | 0 | 1 | 1 |
| 5 | 1 | 1 | 2/3 | 1/3 | 2/3 | 1/3 | 1 | 0 | 1 | 1 |
| 6 | 1 | 0 | 0 | 1 | 0 | 0 | 0 | 1 | 0 | 0 |

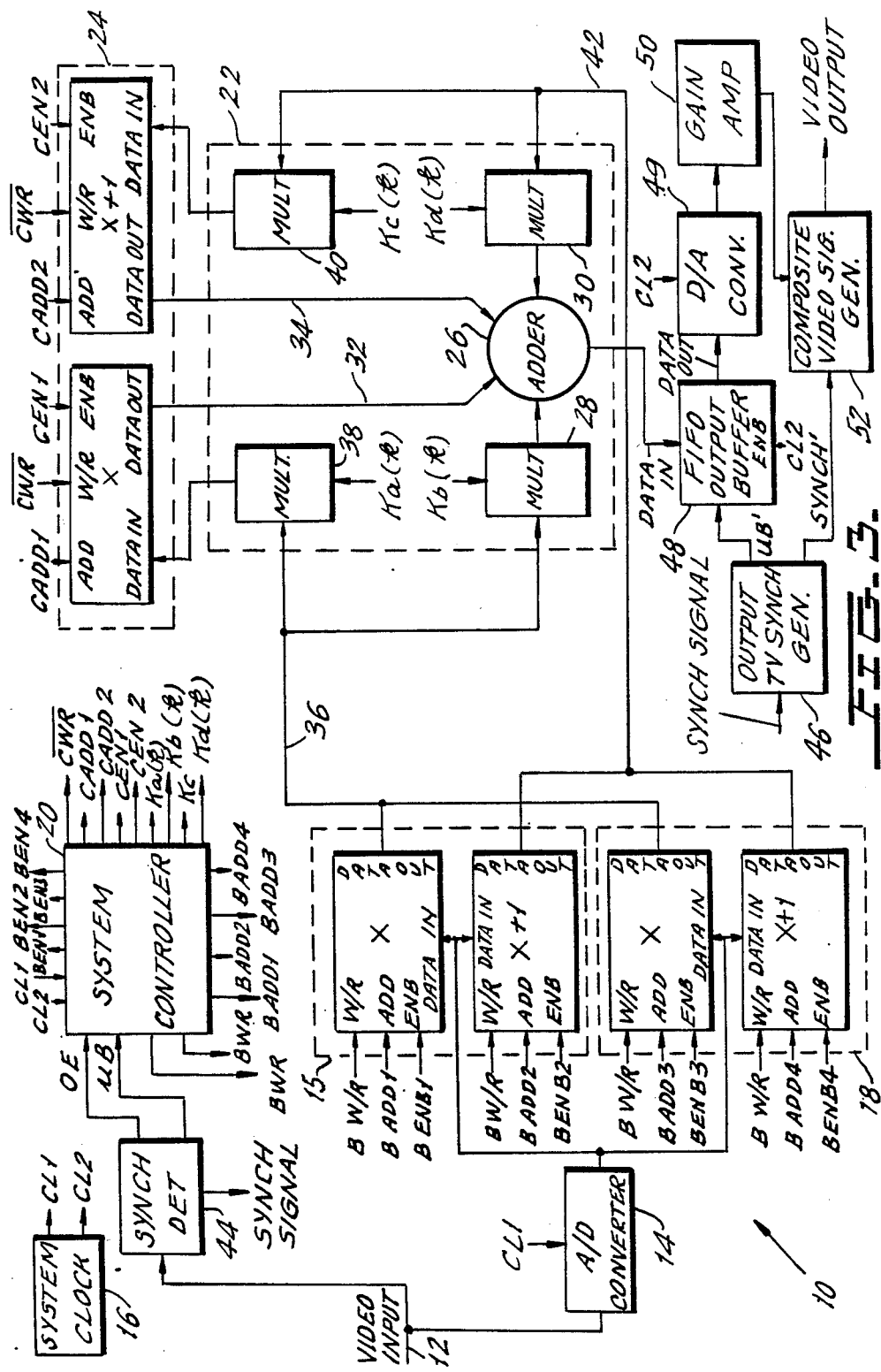

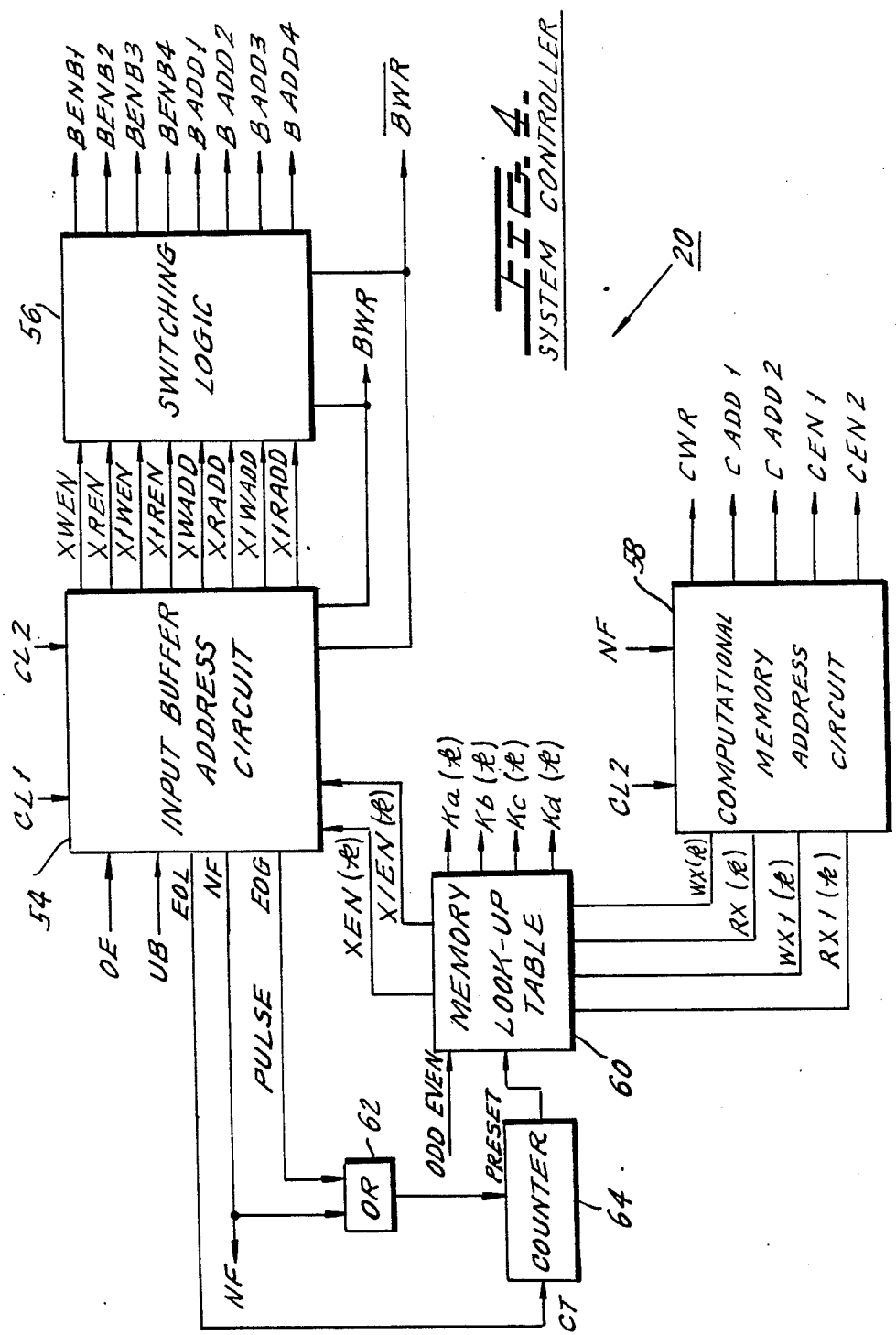

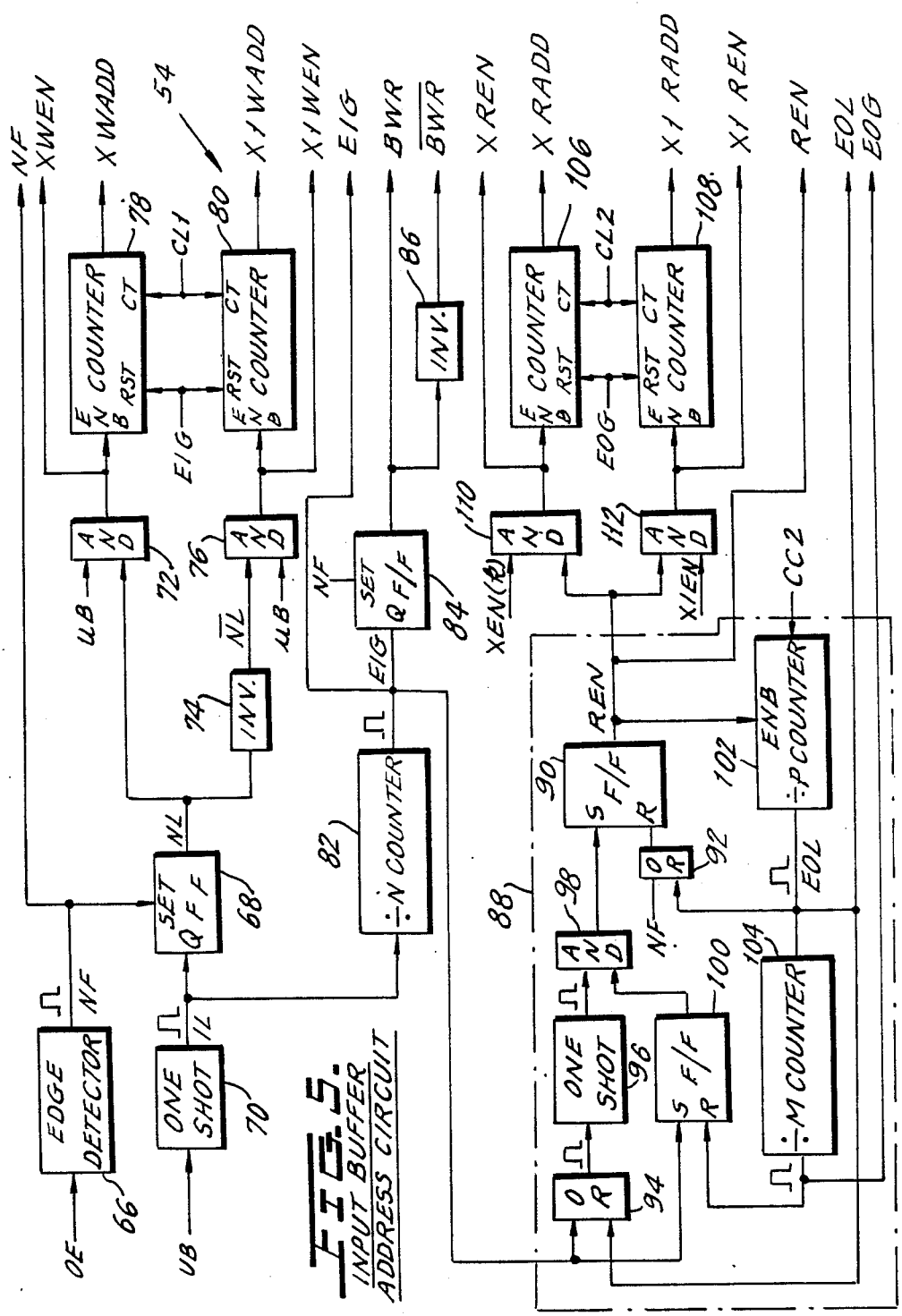
FIG. 5. INPUT BUFFER ADDRESS CIRCUIT

SWITCHING LOGIC

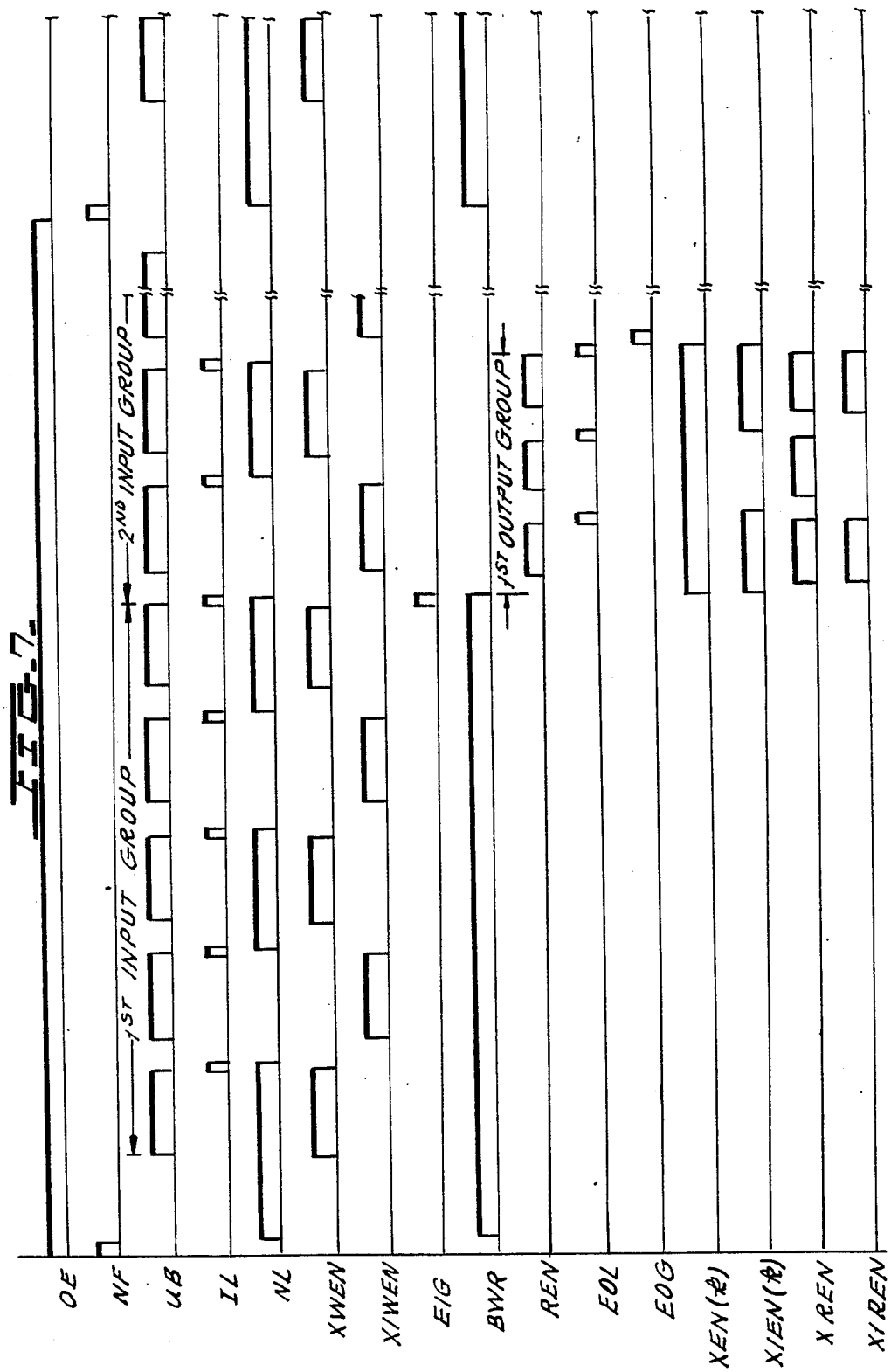

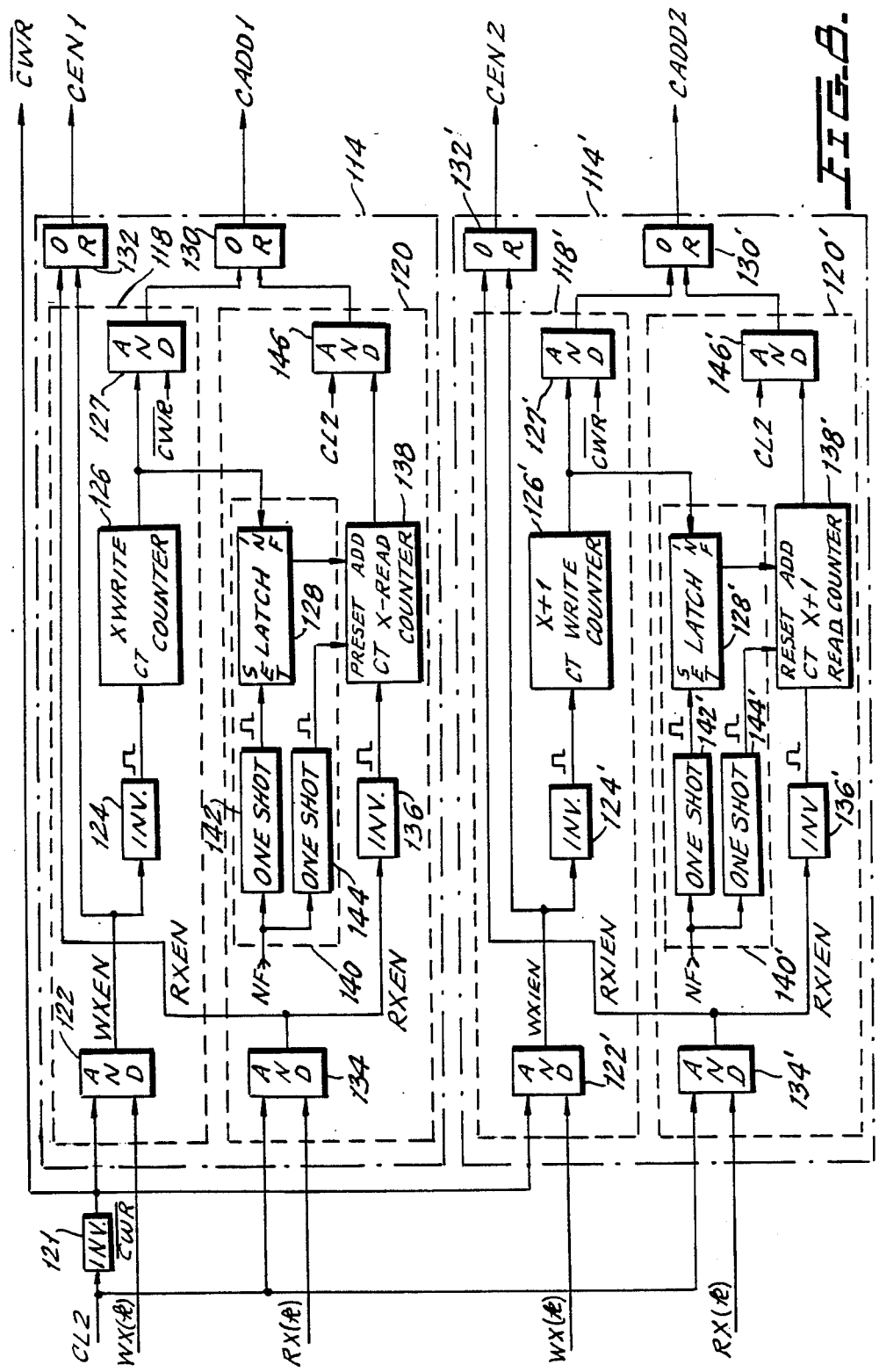

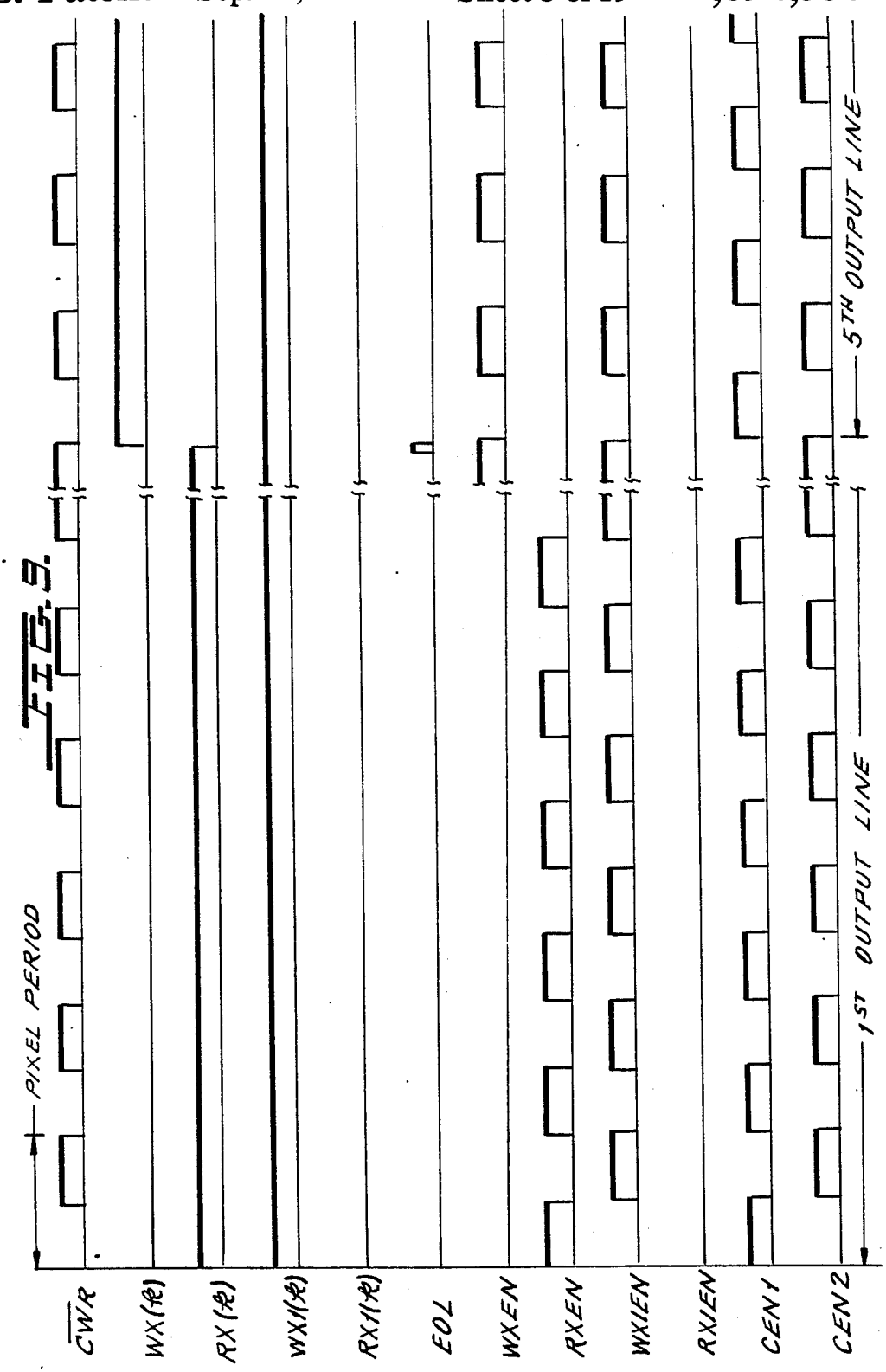

FIG. 11.

| i | INPUT(i) |
|---|---|
| 1 | 0 |
| 2 | 0 |
| 3 | 1 |
| 4 | 1 |
| 5 | 0 |
| 6 | 0 |
| 7 | 1 |
| 8 | 1 |
| 9 | 0 |
| 10 | 0 |

FIG. 12.

| v | X(v) | XI(v) |
|---|---|---|
| 1 | 1 | 3 |
| 2 | 2 | 4 |
| 3 | 5 | 0 |
| 4 | 6 | 8 |
| 5 | 9 | 7 |
| 6 | 10 | 0 |

FIG. 19.

| k | IMIN(k) | IMAX(k) |
|---|---|---|
| 1 | 1 | 2 |
| 2 | 2 | 4 |
| 3 | 4 | 5 |
| 4 | 6 | 7 |
| 5 | 7 | 9 |
| 6 | 9 | 10 |

FIG. 20.

| k | XEN(k) | XIEN(k) |
|---|---|---|
| 1 | 1 | 1 |
| 2 | 1 | 1 |
| 3 | 1 | 0 |
| 4 | 1 | 1 |
| 5 | 1 | 1 |
| 6 | 1 | 0 |

VIDEO LINE RATE CONVERTER

BACKGROUND AND SUMMARY OF THE INVENTION

The present invention is directed towards a video line rate converter. More particularly, the present invention is directed towards a method and apparatus for converting an input video signal having a first number of lines (e.g. 625) into an output signal having a second different number of lines (e.g. 525).

One simple method for achieving the desired conversion is to delete a number of input lines equal to the difference in the number of lines in the input and output video signals. The primary drawback of this method (referred to hereinafter as the truncation method) is that significant input information is lost during the conversion process.

Another possible method for achieving the desired conversion is to use an interpolation method wherein all of the input video information is used to generate the output video signal. By way of a simple example, if the conversion ratio is 2/1, each line of the output video signal can be generated by averaging two associated lines of the input video signal. Thus, lines 1 and 2 of the input video signal can be averaged to produce line 1 of the output video signal; lines 3 and 4 of the input video signal can be averaged to generate line 2 of the output video signal, etc.

While the foregoing method is clearly preferable to the truncation method, it would appear to require a relatively large memory to achieve the desired conversion. A straightforward approach would require that the converter store an entire odd and an entire even field of a single input frame and then utilize a predetermined algorithm to perform the interpolation from the number of lines in the input frame to the number of lines in the output frame. This is undesirable, in terms of hardware requirements (a large memory and associated control circuitry is required).

BRIEF DESCRIPTION OF THE INVENTION

In order to overcome the drawbacks of the foregoing methods, the present invention utilizes an interpolation (preferably, but not necessarily, a linear interpolation) method which utilizes all or substantially all of the input video information to generate the output video signal. In accordance with the presently preferred embodiment, the interpolation method is performed on an interlaced input video signal having odd and even fields. Each line of input video information is a given field is used for two purposes: (1) to generate the present output field, and (2) to generate a subsequent output field. The latter use is achieved by storing the video information in a computational memory until a subsequent output field is generated. This dual use of the input video information makes it possible to reduce the memory requirements of the converter circuit to a size less than or approximately equal to a single input video field.

The present invention further utilizes an interpolation method which divides a single input frame into a number of repetitive conversion groups, each of which represents a small fraction of the entire number of lines in an input field. This makes it possible to begin the conversion process on a given input field as soon as the number of input lines equal to the number of lines in the predetermined group has been received. This substantially reduces the lag of the conversion process and results in an approximation of a real time conversion.

In accordance with the foregoing, the present invention is directed towards an apparatus for converting an input video signal comprising a plurality of input frames, each input frame having P input lines, P being an integer much greater than one, into an output video signal comprising a plurality of output frames, each output frame having Q output lines, Q being an integer much greater than one but different than P, said apparatus comprising:

means for receiving said input video signal; and means for generating said output video signal utilizing substantially all of the video information contained in said video input signal.

The present invention is further directed towards a conversion method for converting an input video signal comprising a plurality of input frames, each input frame having P input lines, P being an integer much greater than one, into an output video signal comprising a plurality of output frames, each output frame having Q output lines, Q being an integer much greater than one but different than P, said method comprising the steps of:

receiving said input video signal; and generating said output video signal utilizing substantially all of the video information contained in said video input signal.

BRIEF DESCRIPTION OF THE DRAWINGS

For the purpose of illustrating the invention, there is shown in the drawings one embodiment which is presently preferred, it being understood, however, that the invention is not limited to the precise arrangements and instrumentality shown.

FIG. 3 is a block diagram of a video rate conversion circuit in accordance with the present invention.

FIG. 4 is a block diagram of the system controller of FIG. 3.

FIG. 5 is a block diagram of the input buffer address circuit of FIG. 4.

FIG. 7 is a timing diagram illustrating various signals appearing in the block diagrams of FIGS. 5 and 6, all on a common time line.

FIG. 8 is a block diagram of the computational memory address circuit of FIG. 4.

FIG. 9 is a timing diagram illustrating various signals appearing in FIG. 8, all on a common time line.

FIG. 11 is a table illustrating the values stored in array in INPUT(l), for the algorithm illustrated in FIG. 2.

FIG. 12 is a table illustrating the values stored in arrays X(k) and X1(k) for the algorithm illustrated in FIG. 2.

FIG. 19 is a table illustrating the values stored in arrays IMIN(k) and IMAX(k) for the algorithm illustrated in FIG. 2.

FIG. 20 is a table illustrating the values stored in the arrays XEN(k) and X1EN(k) for the algorithm illustrated in FIG. 2.

DETAILED DESCRIPTION OF THE INVENTION

As noted above, the present invention preferably utilizes a linear interpolation method to convert an input video signal comprised of input frames having P input lines, P being an integer much greater than one, into an output video signal comprised of output frames having Q output lines, Q being an integer much greater than one but different than P. In the embodiment of the invention described below, the number of lines in the output video signal is less than that in the input video signal. The invention is not, however, so limited and also encompasses a method and apparatus wherein the output video signal has a greater number of lines than the input signal.

In the presently preferred embodiment, the invention utilizes a linear interpolation scheme wherein in all of the input video information is equally distributed into the output video signal. This can be best understood with reference to FIG. 1 which relates five input lines to three output lines (5 to 3 being an approximation of the number of input video lines P to the number of output video lines Q).

Figures 1, 2, 10:
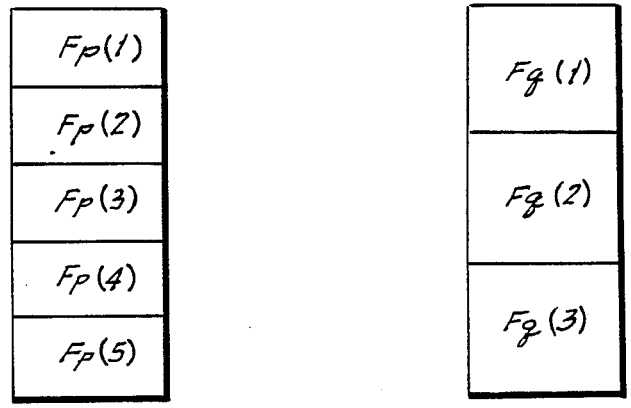
FIG. 1 is a schematic diagram illustrating a linear interpolation method wherein 5 lines of an input video signal are converted into 3 lines of an output video signal.
FIG. 2 is a series of equations which express in mathematical form the relationship illustrated schematically in FIG. 1.
FIG. 10 is a table illustrating various signals stored in the lookup table of FIG. 4, corresponding to the algorithm illustrated in FIG. 2.

The left-hand side of FIG. 1 shows 5 lines of an input video signal, each line being identified as Fp(l) [l=1, 2 ..., 5]. The right-hand side of FIG. 1 illustrates 3 lines of an output video signal, each line being identified as Fq(k) [k=1, 2, 3]. In accordance with a linear interpolation method, all of the input video information is evenly distributed in the output video information. More specifically, each output line Fq(k) includes ⅓ of the total input information or 1⅔ input video lines Fp(i). The first output line Fq(1) contains all of the first input line Fp(1) and ⅔ of the second input line Fp(2). The second output line Fq(2) contains the remaining ⅓ of the second input line Fp(2), all of the third input line Fp(3) and ⅓ of the fourth input line Fp(4). The third output line Fq(3) includes the remaining ⅔ of the fourth input line Fp(4) and all of the fifth input line Fp(5), etc.

Figure 13A:
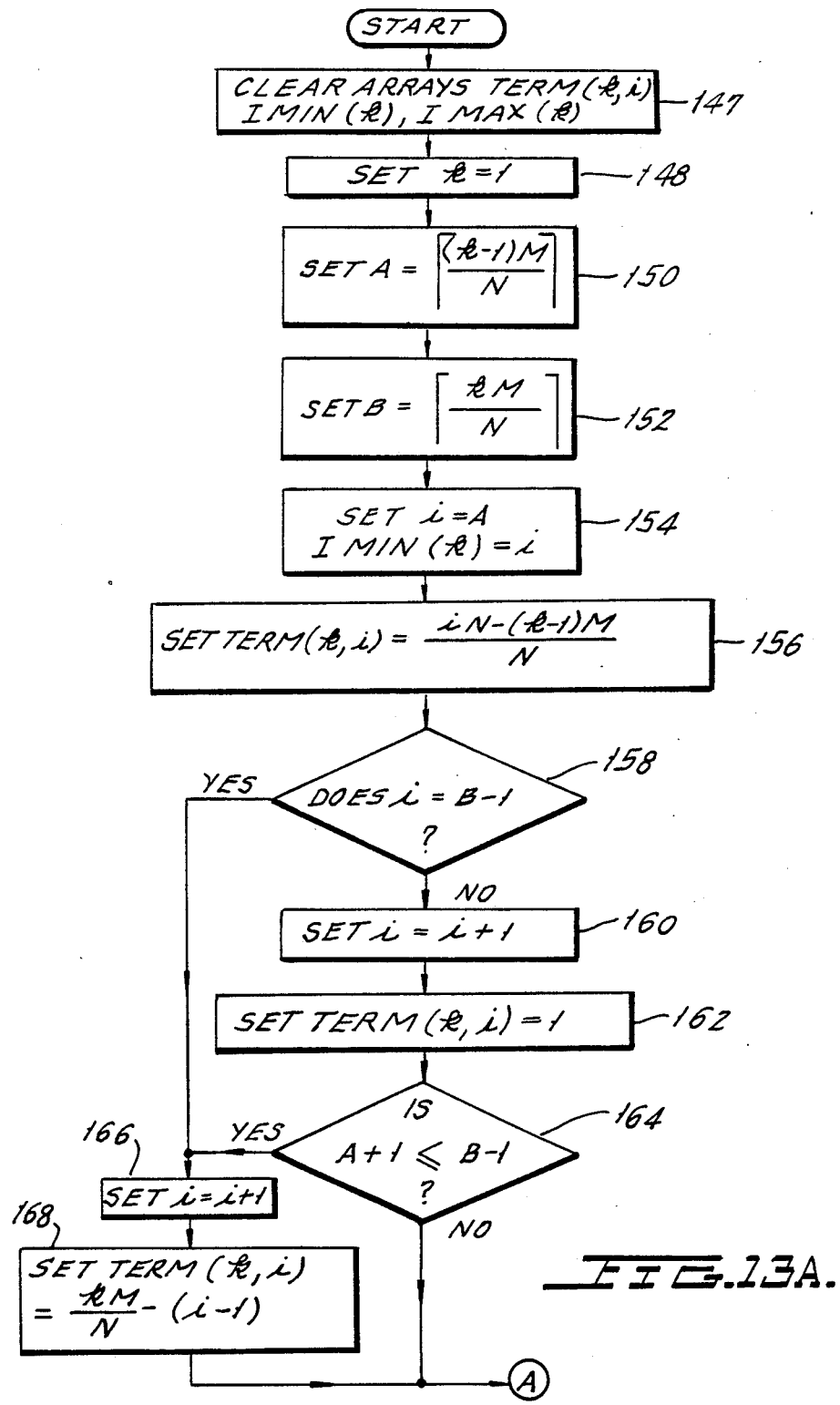
FIGS. 13A and 13B are a flow diagram of a computer program which can be used to generate the equations relating an input group to an output group in accordance with the linear interpolation method of the presently preferred embodiment of the invention.
Figure 13B:
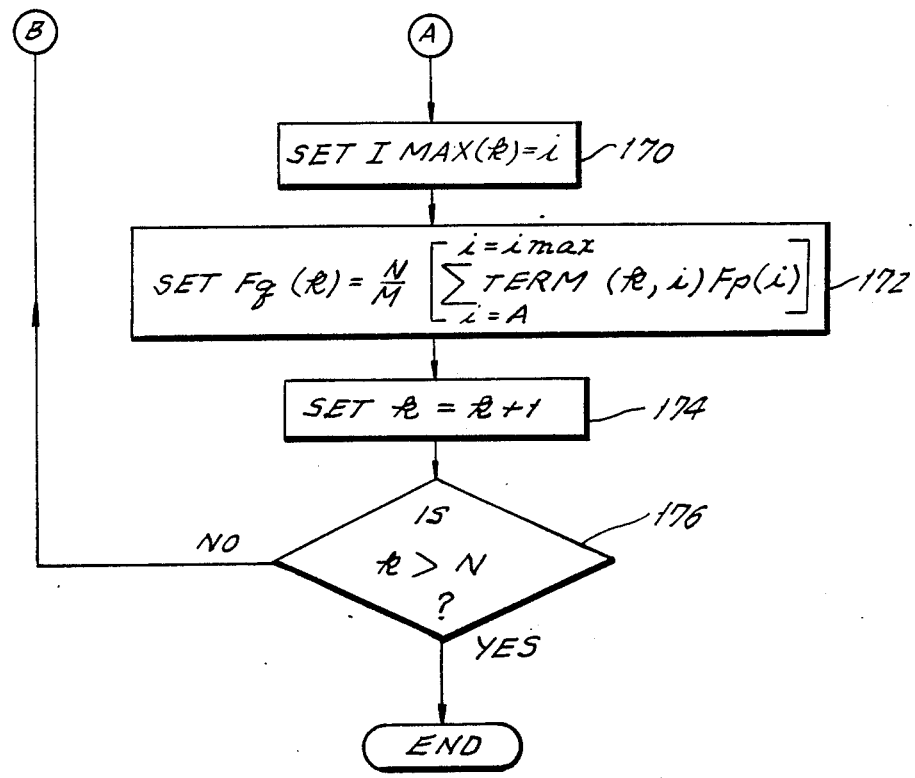

The relationship between the input video lines Fp(l) and the output video lines Fq(i) are expressed in algorithmic form in FIG. 2. The input video information used to create the output video lines is multiplied by a normalizing factor of 3/5 in the example shown to ensure that the quantity of information in each output line Fq(k) is equal to the quantity of information in each input line Fp(k). While a 5 to 3 conversion has been assumed, the interpolation method can be applied to any ratio of input to output lines. A flow diagram which will enable a computer to generate an algorithm equivalent to FIG. 2 for any specific ratio wherein the number of output lines, is smaller than the number of input lines is illustrated in FIGS. 13A-13B and described below. While the preferred embodiment utilizes this linear interpolation method, the present invention encompasses other interpolation schemes in addition to that described herein.

As shown in FIG. 2, each output line Fq(k) is a function of two or more input lines Fp(i). More particularly, each output line is a function of both the odd and even input fields. This would normally require that two entire input fields (odd and even) be stored in order to generate a single output field. The preferred embodiment of the present invention overcomes this necessity by dividing each odd and even input field into a plurality of input groups, each containing M input lines, M being an integer greater than one but much smaller than P (the number of input lines in an input frame) and dividing the odd and even output fields into a plurality of output groups, each containing N output lines, N being an integer greater than one but much smaller than Q (the number of lines in an output frame) and generating a single output group each time a single input group has been generated. More particularly, each time an input group of a given field (e.g. an odd field) is received, an output group is generated as a function of the input lines of that input group and additional input lines of the input field received immediately prior to the present input field (e.g. the even input field). In accordance with this process, the converter need merely store a number of input lines equal to or less than one field plus approximately one input group. Since an input group is a small fraction of an input field (typically 1/100 of an input field), the present invention reduces the memory requirements and the time delay in generating an output field by approximately ½ that which would be required if an entire frame consisting of both an odd an even field were stored prior to the generation of an output field. The algorithm used to convert the input video information to the output video information is designed to relate a number of input lines corresponding to an input group to a number of output lines corresponding to an output group such that the algorithm can be carried out each time an input group has been received.

Since it is preferable that all of the video input information be contained in the video output signal, the ratio of input lines in an input group to output lines in an output group (M/N) is ideally equal to the ratio of input lines in an input frame to output lines in an output frame (P/Q). As a practical matter, however, the actual ratio of input lines in an input group to output lines in an output group need not be exactly equal to the ratio of lines in an input frame to lines of an output frame, but is preferably a convenient approximation thereof. Thus, if a 625 line input signal is being converted to a 525 line output signal, a ratio of 5/4 (an approximation of 625/525) is preferably utilized. While this will result in some minor distortion of the output video signal, it is normally within a few percent and is acceptable for most practical applications. If higher accuracy is required, a more exact ratio can be used. The trade-off is between the acceptable distortion in the video output signal versus the cost and time advantages of utilizing a small input group.

Referring now to FIG. 3, a block diagram of the presently preferred embodiment of the line rate converter 10 of the present invention will now be described. The video input signal to be converted is received on line 12 and applied to an A/D converter 14 which samples the analog input signal at a clock rate determined by the clock signal CL1 generated by system clock 16. The frequency of clock signal CL1 is determined as a function of the desired resolution of the video output signal. The clock signal effectively divides each input line Fp(i) into a number of pixels equal to the duration of each input line divided by the period of the clock CL1. As such, the higher the clock frequency, the greater the number of pixels, and therefore the greater the resolution of the output signal.

The pixels appearing at the output of A/D converter 14 are applied to input buffers 16, 18. The operation of these buffers is controlled by the system controller 20 in a manner which will be described in greater detail below. It is sufficient at this time to note that system controller 20 causes all of the pixels of successive input groups to alternately be written into the buffers 16, 18 as they are received. The input buffers 16, 18 into which the pixels of the input lines are being written will be referred to hereinafter as the write input buffers 16, 18.

Each input buffers 16, 18 is divided into two sections: an x section and an x+1 section. Each successive input line of an input group is read into alternate sections of the write input buffers 16, 18. In the example being considered, an input group includes five lines. As a result, the first, third and fifth lines of an input group (e.g., odd field input lines Fp(1), Fp(5) and Fp(9)) will be stored in the x section of the write input buffers 16, 18 and the second and fourth lines of an input group (e.g., odd field input lines Fp(3) and Fp(7)) will be stored in the x+1 section of the write input buffers 16, 18.

Assuming that an odd field is being received, the five lines of the input group will be identified as Fp(1), Fp(3), Fp(5), Fp(7) and Fp(9). While these are designated lines 1, 3, 5, 7 and 9 for the purpose of the algorithm being used, it will be understood that it is not necessarily the first five lines of the input field, but is rather the five lines of the input group. Thus, line Fp(1) will be the first line, the eleventh line, the twenty-first line, etc., of a given input field. Since the algorithm illustrated by way of example in FIG. 2 is repetitive for an input group, it does not matter whether the actual input line is the first, eleventh, twenty-first, etc. It is only important where the line is located within the input group and whether an odd or even input group is stored in the buffers 16, 18.

Once an input group has been stored in the write input buffers 16, 18, it will then be read out of the input buffer and applied to arithmetic unit 22 which generates the output lines Fq(k) under the control of system controller 20 in accordance with the algorithm illustrated in FIG. 2 (or any other desired algorithm which is used by the system controller 20). The input buffers 16, 18 operating in the read mode and applying stored pixels to the arithmetic unit 22 will be referred to hereinafter as the read input buffers 16, 18. System controller 20 controls the operation of input buffers 16, 18 such that while one of the input buffers is receiving pixels appearing at the output of A/D converter 14 and is operating as the write input buffer, the remaining input buffer is applying stored pixels to the arithmetic unit 22 and operating as the read input buffer.

The arithmetic unit 22 generates the output lines (pixel-by-pixel) of an output group in accordance with the algorithm corresponding to the interpolation method being employed. In the following description, this algorithm will be referred to simply as the algorithm of FIG. 2. As described above, however, the invention is not limited to this algorithm or this specific 5/3 conversion ratio described.

As shown in FIG. 2, each output line Fq(k) is generated as a function of one or more input lines Fp(i) of the field presently being received and stored in the read input buffers 16, 18 (e.g., the odd field) and/or one or more input lines Fp(i) of the immediately preceding field (e.g. the even field) which had been previously received by line rate converter 10. By way of example, the output line Fq(5) is generated as a function of the input lines Fp(7), Fp(8) and Fp(9). In the presently preferred embodiment, the output group being generated forms part of the same field (e.g., odd) as the input group being received. Since the output line Fq(5) is part of an odd output group, the lines Fp(7) and Fp(9) are stored in the read input buffers 16, 18 and may be applied to arithmetic unit 22, via lines 36 and 42. The input line Fp(8) is part of an even field and was received during the receipt of the immediately preceding input field. To ensure that this previously received even field input line is available for use during the generation of the subsequent odd output field, the present invention provides a computational memory 24 which stores those lines of a given input field which are required to generate the opposite output field. These input lines are stored in computational memory 24 when they are first applied to arithmetic unit 22 from the read input buffers 16, 18.

The output signal Fq(5) is generated by adder 26 which adds ⅓ of the input line Fp(7), all of the input line Fp(8) and ⅓ of the input line Fp(9). See FIG. 2. The normalizing factor 3/5 is interjected into the output signal in gain amplifier 50 as described below. As will be explained in further detail below, the input lines Fp(7) and Fp(9) will be contained on lines 42 and 36, respectively. The signals are each multiplied by a factor of ⅓ in multipliers 28 and 30, respectively. The multiplying factor required to generate each output line is stored in system controller 20 which applies the appropriate control signal Kb(k) and Kd(k) to multipliers 28 and 30, respectively. As shown in FIG. 3, no multiplier is interposed in the lines 32, 34 extending from the computational memory 24 to the adder 26. While this could be done, the presently preferred embodiment of the invention instead interposes multipliers 38 and 40 between lines 36 and 42, respectively, and the computational memory 24. System controller 20 controls the operation of multipliers 38 and 40 so that the appropriate multiplying constant is applied to the input line Fp(i) before it is stored in computational memory 24. Since the multiplying factor for the input line Fp(8) to be read out of computational memory 24 is one, the system controller 20 would have caused the appropriate multiplier 38, 40 to multiply each pixel of the input line Fp(8) when it was first read out of the read input buffers 16, 18 and into the computational memory 24.

As should be clear from the foregoing, each input line Fp(i) applied to arithmetic unit 22 may be used for two purposes: (1) it may be used to generate the present output line Fq(k) by being applied to adder 26 (after being passed through the appropriate multiplier 28, 30), and/or (2) it may be stored in computational memory 24 (after passing through the appropriate multiplier 38, 40) for use in generating a subsequent output field.

In the embodiment of the invention illustrated in FIG. 3, the arithmetic unit 24 is capable of adding up to four different input lines Fp(i) to generate a single output line Fq(k). More particularly, it can add up to two input lines of the input field presently being received by the converter 10 and two input lines which had been received as part of the immediately preceding input field. This is sufficient for substantially any practical conversion ratio which uses input and output groups having fairly small numbers (e.g. under 15 lines).

The present invention utilizes a liner interpolation method to convert the input video information into the output video signal. As shown in FIG. 2, an inherent feature of this method is that the two input lines of the same field which are used to generate any output line are successive input lines. By way of example, the output line Fq(2) is a function of successive even field input lines Fp(2) and Fp(4) and output line Fq(5) is a function of successive odd field input lines Fp(7) and Fp(9). The present invention takes advantage of this fact and significantly simplifies the structure and operation of the required circuitry dividing each of the memories 16, 18 and 24 into x and x+1 sections and by insuring that the first, third, fifth, etc. line of every odd and even field is stored in x section of memory 16, 18 and 24 and that the second, fourth, sixth, etc. input lines of both the odd and even input fields are stored in the x+1 section of memory 16, 18 and 24. In addition to simplifying the circuitry, this bifurcation of the memories insures that adjacent input lines of the same input field as that contained in buffers 16 and 18 will be available on lines 36 and 42 and can be applied to adder 26 after passing through multipliers 28 and 30, respectively, and further insures that adjacent input lines of the opposite field which are stored in memory 24 will be available on lines 32 and 34 and pass directly to adder 26. As such, adder 26 can add up to four input lines at any given instant; two adjacent lines from an odd field and two adjacent lines from an even field.

The signals appearing at the output of adder 26 are successive pixel of an output line being generated. These pixels signals are clocked into successive memory locations of a FIFO output buffer 48 by the clock signal CL2 generated by system clock 16. The clock signal CL2 will have a period equal to the time it takes to generated the video information (as opposed to the synchronizing information) of an output line divided by the number of pixels in the output line. This number will normally be equal to the number of pixels in an input line as determined by the clock signal CL1. FIFO output buffer 48 is enabled by the output signal unblanking signal UB' which defines the time interval in which the video information, as opposed to video synchronization information, appears in the video output signal. As such, the information in FIFO output buffer 48 will be clocked through the buffer only when the buffer is enabled by the unblanking signal UB'.

The pixel information appearing at the output of adder 26 must be properly timed to coincide with the unblanking signal UB' such that the pixels are applied to the FIFO output buffer only when the buffer is enabled by the unblanking signal UB'. This function is performed by the system controller 20 in a manner which will be described in further detail below.

The output of FIFO output buffer 48 is applied to a digital to analog converter 49 which converts the pixels appearing at the output of buffer 48 into an analog signal corresponding to the output line being generated. This signal is applied to a gain amplifier 50 which multiplies the signal by the equalizing factor M/N to insure that the amplitude of the video output signal is normalized with respect to the amplitude of the input signal. The signal appearing at the output of gain amplifier 50 represents the video information portion of the video output signal. This signal is combined with an appropriate synchronization signal SYNCH' in composite video signal generator 52 whose output represents the output of the converter 10. The synch signal SYNCH' is generated by output TV synch generator 46 which receives the input synch signal SYNCH at its input and generates both the output synch signal SYNCH' and the output unblanking signal UB' at its output. The input synch signal SYNCH is generated by synch detector 44 in response to the video input signal on line 12. The synch detector 44 removes the synch signal from the composite video input signal and applies it to the output TV synch generator 46 as described. The synch detector 44 also generates the input unblanking signal UB which defines the time interval during which video information (as opposed to synchronizing information) is contained in the video input signal. This signal is applied to system controller 20 which controls the timing of the various operations of the line rate converter 10 as a function of this signal. The synch detector 44 also generates an odd/even signal OE indicating whether the field presently being received is an odd field or an even field. This signal is also applied to system controller 20 and is used to determine the appropriate values of the control signals which must be generated by system controller 20, as will be described in greater detail below.

Summarizing the foregoing, a video input signal is received on line 12, converted into individual pixels in A/D converter 14 and stored in successive locations of the write input buffers 16, 18. Once all of the pixels of each line of an input group has been stored in the write input buffers 16, 18, that input buffer will become the read input buffer and the remaining input buffer will receive the next group of input lines.

The pixel information stored in the read input buffers 16, 18 is applied pixel by pixel to the arithmetic unit 22 which also receives successive pixels of input lines from the immediately preceding input field which are stored in the computational memory 24. System controller 20 determines which input lines are required to generate the present output lines and applies those lines pixel-by-pixel to the adder 26. System controller 20 also ensures that the pixels of the input lines will be multiplied by the appropriate fractions in multipliers 28 and 30 when the input line is being applied immediately to adder 26 and by multipliers 38 and 40 when the pixels are being stored in computational memory 24 for later use. The pixels appearing at the output of adder 26 represent the video information of the required output line and are combined with appropriate synch signals in composite video signal generator 52 after being converted to an analog signal in D/A converter 49 and being multiplied by the appropriate normalization factor in gain amplifier 50.

As noted above, the operation of input buffers 16, 18 is controlled by the system controller 20. The input buffers 16, 18 are standard RAM circuits which typically include a write/read input W/R, an addresses input ADD, an enable input ENB, a data input DATA IN and a data output DATA OUT. The signal appearing at the data input will be read into the address location identified by a signal applied to the address input ADD whenever the write/read input is high and the enable input is high. The information stored in the address location of the memory determined by the signal applied to the address input ADD will be applied to the data output whenever the write/read signal W/R is low and the enable signal is high. As such, the read and write operations of these memories are controlled by the signals applied to the control inputs W/R, ADD and ENB.

In order to control the read and write operations of buffers 16, 18, system controller 20 generates the control signals: BWR, BWR, BADD1, BADD2, BADD3, BADD4, BENB1, BENB2, BENB3 and BENB4. The x and x+1 sections of computational memory 20 are of similarly construction to memories 16, 18 and are controlled by control signals CWR, CADD1, CADD2, CEN1 and CEN2. By generating these control signals, as well as the multiply coefficient control signals $Ka(k)$, $Kb(k)$, $Kc(k)$ and $Kd(k)$, the controller 20 controls the operation of converter 10.

The structure and operation of controller 20 will now be described with reference to FIGS. 4–12. As shown in FIG. 4, controller 20 includes an input buffer address circuit 54, switching logic 56, a computational memory address circuit 58, a memory 60, OR gate 62 and counter 64. Input buffer address circuit 54, in cooperation with switching logic 56, generates the output signals required to control the read and write operation of input buffers 16, 18. Computation memory address circuit 58 generates the control signals required to control the read and write operations of computational memory 24. The address circuits 54 and 58 generate the appropriate control signals as a function of a line rate conversion table stored in memory 60. The line rate conversion table stores signals which are dictated by the algorithm being used to convert the input signal into the output signal (e.g. the output equations illustrated in FIG. 2). The line rate conversion table utilized to obtain a 5 to 3 conversion ratio utilizing a liner interpolation method in accordance with the present invention is shown in FIG. 10. The line rate conversion table stored in memory 60 includes various conversion signals which vary as a function of the output line k of a given group being generated. The conversion signals fall into three groups: those applied to input buffer address circuit 54 (enable signals $XEN(k)$ and $X1EN(k)$), those applied to computational memory address circuit 58 (enable signals $WX(k)$, $RX(i)$, $WX1(k)$ and $RX1(k)$) and those applied to arithmetic unit 22 (multiplying constants $Ka(k)$, $Kb(k)$, $Kc(k)$ and $Kd(k)$). The enable signals $XEN(k)$ and $X1EN(k)$ are applied to the input buffer address circuit 54 and tell the address circuit whether the x and/or x+1 sections of the read input buffers 16, 18 are to be enabled during the generation of the kth output line of an output group. The enable signals $WX(k)$, $RX(k)$, $WX1(k)$ and $RX1(k)$ are applied to the computational memory address circuit 58 and tell the address circuit 58 whether the x and/or x+1 section of the computational memory 24 is to write information from the arithmetic unit 22 and/or read information to the arithmetic unit 22 during the generation of the current output line k of an output group. This information is stored in the form of binary "1"s and "0"s, a binary "1" indicating that a read or write operation is to take place, a binary "0" indicating that a read or write operation is not to take place.

The control signals $Ka(k)$, $Kb(k)$, $Kc(k)$ and $Kd(k)$ are applied to the multipliers 38, 28, 40 and 30, respectively, of arithmetic unit 22 and control the multiplication factor of each of these multipliers. The actual multiplication factor is stored in the line rate conversion table as shown in FIG. 10.

The memory 60 can be a read only memory (ROM) in which the line rate conversion table has been prestored for a given conversion ratio (5 to 3 in the example illustrated). Different plug-in ROMs can be used to change the conversion table and thereby the conversion ratio of the line rate converter. Alternatively, a microprocessor can be used to generate the various conversion signals of the conversion table and store them in arrays in $XEN(k)$, $X1EN(k)$, $Ka(k)$, $Kb(k)$, $Kc(k)$, $Kd(k)$, $WX(k)$, $RX(k)$, $WX1A(k)$ and $RX1(k)$ which correspond to the conversion signals of the same name. These signals will be stored in a RAM corresponding to memory 60. Flow diagrams of a computer program which can be used to generate these arrays are illustrated in FIGS. 13–18 and will be described below. For the purpose of the following description, it will be assumed that the memory 60 is a read only memory having the conversion table illustrated in FIG. 10 stored therein. The present invention is not, however, limited to the use of a read only memory.

In the presently preferred embodiment, the conversion method is carried out on an interlaced TV signal having odd and even fields. For this reason, memory 60 is preferably broken up into two separate sections, one storing the control signal values for the odd field input group and one storing the control signal values for the even field input group. The odd/even signal OE is applied to memory 60 to enable the odd field memory when an odd field is being received and the even field memory when an even field is being received.

As noted above, the various values of the control signals varies as a function of the output line k presently being generated (the output line of a given group rather than the absolute position of the output line in a frame or field). A counter 64 is used to keep track of the line number within each output group and applies an output signal indicative of the line number to memory 60. This signal acts as an address signal identifying the location of the appropriate value of the conversion signals for the output line being generated.

The counter 64 includes a preset input which is connected to an OR gate 62. Whenever a binary "1" is applied to the preset input of counter 64, the count in counter 64 is preset to 1. Since the count in counter 64 identifies the output line within an output group, the count in counter 64 should be preset to 1 at the beginning of the generation of each output group. To this end, the OR gate 64 receives the new field signal NF (which pulses high at the beginning of a new input field) and an end of output group signal EOG (which pulses high at the end of the receipt of each output group). The count in counter 64 is increased by 1 every time a positive going pulse is applied to its count input CT. This should happen at the beginning of each successive output line. To this end, input buffer address circuit 54 applies the end of output line signal EOL to the count input CT of counter 64 at the end of the generation of each output line. In this manner, the count counter 64 always indicates the line number of an output group presently being generated and thereby assures that memory 60 will generate the appropriate conversion signals for the generation of the output line presently being generated.

The structure of the input buffer address circuit 54 is illustrated in FIG. 5. The odd/even signal OE generated by synch detector 44 is applied to edge detector 66 which generates an output pulse each time the odd-/even signal OE undergoes a transition from the binary "1" to the binary "0" or from the binary "0" to the binary "1" level. As such, the pulses appearing at the output of edge detector 66 indicate the beginning of a new field (odd or even). This signal is the new field signal in NF referred to with reference to FIG. 4, supra.

The new field signal is applied to flip-flop 68 and sets the output of the flip-flop to the binary "1" level. The output of flip-flop 68 is the new line signal NL which switches between the binary "1" and "0" level each time a new input line has been received (and read into the write input buffers 16, 18). The new field signal NF is used to set flip-flop 68 to insure that the new line signal NL is at the binary "1" level at the beginning of every field.

Once the flip-flop 68 has been set by the new field signal NF, it is toggled between the binary "1" and binary "0" level by the input line pulse IL generated by one shot 70. One shot 70 receives the unblanking signal UB (which is at the binary "1" level whenever video information, as opposed to synch information, is contained in the video input signal on line 12 and is at the binary "0" level at all other times). One shot 70 generates a single positive going pulse whenever the unblanking signal UB goes through a transition from the binary "1" to the binary "0" level (see FIG. 7).

As described above, every other input line of an input group is applied to the x section of the write input buffers 16, 18, the remaining lines being written into the x+1 section of the buffer. The new line signal NL is used to select which section of the buffers 16, 18 receives the incoming input line. More particularly, the new line signal is used to gate the unblanking signal UB (in AND gate 72) and thereby generate the x section write enable signal XWEN. The x section write enable signal XWEN is applied to switching logic 56 which will apply it to the enable input of the x section of the write input buffers 16, 18 (as described further below). This will cause the first, third, etc. input lines of an input group to be written into the x section of the write input buffers 16, 18.

The inverted new line signal NL (appearing at the output of inverter 74) is used to gate the unblanking signal UB (in AND gate 76) so as to generate the x+1 section write enable signal X1WEN. The x+1 section write enable signal X1WEN is applied by switching logic 56 to the enable input of the x+1 section of the write input buffers 16, 18 so as to cause the second, fourth, etc. input line to be written into the x+1 section of that buffer. The signals XWEN and X1WEN are also used to control the generation of the x section write address signal XWADD and the x+1 write address signal X1WADD, respectively. To this end, the signal XWEN is applied to the enable input of counter 78 and the X1WEN signal is applied to the enable input of counter 80. These counters are reset by the end of input group signal EIG (see FIG. 7) which is generated by divid by N counter 82 at the end of each input group (continuing M lines). This insures that the count in counters 78 and 80 is initialized at the beginning of each input group. Thereafter, the count in counters 78 and 80 will be increased at the clock rate CL1 whenever a binary "1" is applied to its enable input. Since the clock signal CL1 determines the pixel rate of the signal appearing at the output of A/D converter 14 (FIG. 3), the count in counter 78 will be increased by one each time a new pixel appears at the output of converter 48 during the receipt of the first, third, etc., lines of an input group. Similarly, the count in counter 80 will increase by one each time a new pixel appears at the output of converter 14 during the receipt of the second, fourth, etc., lines of an input group. The count in counter 78 defines the x section write address XWADD while the count in counter 80 defines the x+1 section write address X1WADD. The x section write address XWADD are applied to the address input of the x section of the write input buffers 16, 18 by switching logic 56 while the x+1 write address X1WADD is applied to the x+1 section of the write input buffers 16, 18 by switching logic 56. In this matter, successive input pixels of the first, third, etc., lines of the input signal of a group will be stored in sequential locations in the x section of the write input buffers 16, 18 while successive pixels of the second, fourth, etc., input lines of an input group will be stored in successive locations of the x+1 section of the write input buffers 16, 18.

Returning to FIG. 5, the input line signal IL generated by one shot 70 is applied to a divide by N counter 82 which generates the end of group signal EOG each time it receives N input line pulses IL. This signal is applied to a flip-flop 84 which toggles between the binary "1" and binary "0" state in response thereto. The output of flip-flop 84 defines the buffer write/read signal BWR which is applied to the read/write input of both sections of input buffer 16. This signal is inverted by inverter 86 and the resulting signal BWR is applied to the read/write input of both sections of input buffer 18. These signals determine which buffers 16, 18 is the write input buffer and which is the read input buffer. When the signal BWR is at the binary "1" level, it will cause input buffer 16 to operate as the write input buffer and input buffer 18 to operate as the read input buffer. Conversely, when the signal BWR is at the binary "0" level, the input buffer 16 will operate as the read input buffer and input buffer 18 will operate as the write input buffer. To ensure the first input group of a given field is written into the input buffer 12, the new field signal NF is applied to the set input of flip-flop 84 to cause the BWR signal to be at the binary "1" level at the beginning of each new field. In addition to being applied to the buffers 16, 18, the signals BWR and BWR are applied to switching logic 56 and control which of the buffers 16, 18 receive the write control signals and which receive the read control signals. This is discussed further below.

The foregoing structure of address circuit 54 generates the control signals which controls the writing of input pixels into the write input buffers 16, 18. These signals are synchronized with the conversion rate of A/D converter 14 and are substantially independent of the rate at which output lines are generated.

The circuitry illustrated in the bottom half of FIG. 5 is used to generate the control signals which control the reading of information out of the read input buffers 16, 18. This process is started as soon as all of the pixels of an input group has been written into one of the buffers 16, 18 and is carried out at a rate determined by the frequency at which pixels are generated by arithmetic unit 22. This rate is substantially independent of the rate at which input lines are read into the write input buffers 16, 18 except that an entire group of input lines must be applied to the arithmetic unit 22 before the next input group is written into the write input buffers 16, 18. Generally speaking, the pixels stored in the read input buffers 16, 18 are read out of the buffer and into arithmetic unit 22 at a significantly lower frequency than the frequency at which input pixels are written into the write input buffers 16, 18. A small delay must be provided, however, at the end of every input line read out of the read input buffers 16, 18 and applied to the arithmetic unit 22 to permit the control circuit 20 to change the values of its control signals accordingly.

Returning to FIG. 5, the end of input group signal EIG is applied to a read enable signal generator 88 which generates the read enable signal REN illustrated in FIG. 7. This signal is at the binary "1" level whenever an input line is to be read out of the read input buffers 16, 18 and is at the binary "0" level at all other times. The read enable signal REN is generated by a flip-flop 90 which is reset to the binary "0" level by the new field signal NF applied to its reset input via OR gate 92. The read enable signal REN is set to the binary "1" level at the beginning of each output group by the end of input group signal EIG applied to OR gate 94. The output of OR gate 94 is applied to one shot 96 which generates a positive going pulse after a predetermined time delay in response thereto. The time delay is chosen to be sufficient to permit system controller 28 to generate new control signals for the next output line to be generated before the read enable signal REN is set to "1". The output of one shot 96 is then applied to the set input of flip-flop 90 since AND gate 98 is gated by the output of flip-flop 100 which was previously set to the binary "1" level by the end of input group signal EIG. This causes the read enable signal REN to pulse to the binary "1" level defining the beginning of a first output line. The read enable signal REN is applied to the enable input of divide by P counter 102 whose count input receives the clock signal CL2. The clock signal CL2 determines the rate at which output pixels are generated by arithmetic unit 22 and applied to the FIFO output buffer 48 (FIG. 3). The counter 102 counts the clock pulses and generates the end of output line signal EOL when it has received a number of clock pulses (P pulses) equal to the number of pixels in an input line (and therefore in an output line).

The end of output line signal EOL is applied to the reset input of flip-flop 90 via OR gate 92 and causes the read enable signal REN to return to the binary "0" level at the end of the generation of an output line. The end of output line signal EOL is also applied to one shot 96 via OR gate 94 causing the read enable signal REN to return to the binary "1" level after the time delay determined by one shot 96. In this way, arithmetic unit 22 begins generating the pixels of the second output line (of a given field) as soon as system controller 20 has had an opportunity to change the values of its various control signals. This process is repeated until M output lines have been generated; that is until the end of an output group. At that time, divide by M counter 104 (which counts the end of line pulses EOL) generates a single pulse at its output (the end of output group pulse EOG) and thereby resets flip-flop 100 and disables AND gate 98. Since the output of one shot 96 is not generated until after a predetermined time delay, this ensures that the read enable signal REN stays at the binary "0" level until the next end of input groups pulse EIG is received by OR gate 94. At that point, the process is repeated.

The read anable signal REN defines the time period during which an output line is being generated and therefore the time period during which stored pixels must be read from the read input buffers 16, 18 to the arithmetic unit 10. This signal must be gated, however, by the x section enable and x+1 enable signals XEN(k) and X1EN(k). Two input lines can be applied from the read input buffers 16, 18 to the arithmetic unit 22 at any given instant to generate a given output line. During the generation of some output lines, two input lines are required. In others only one input line is required. In the preferred embodiment of the invention described herein, each input line can be read out of the read input buffers 16, 18 only once due to the sequential addressing of counters 106 and 108 (described below). For this reason, the order in which input lines are read out of the read input buffers 16, 18 must be carefully chosen to ensure that:

(1) any input line which is used to generate an output line of the same field is applied to arithmetic unit 10 during the generation of that output line; and (2) input lines which are not used to generate any output lines of the same field are applied to arithmetic unit 10 during the generation of an output line which requires only a single input line of the same field.

Figure 15:
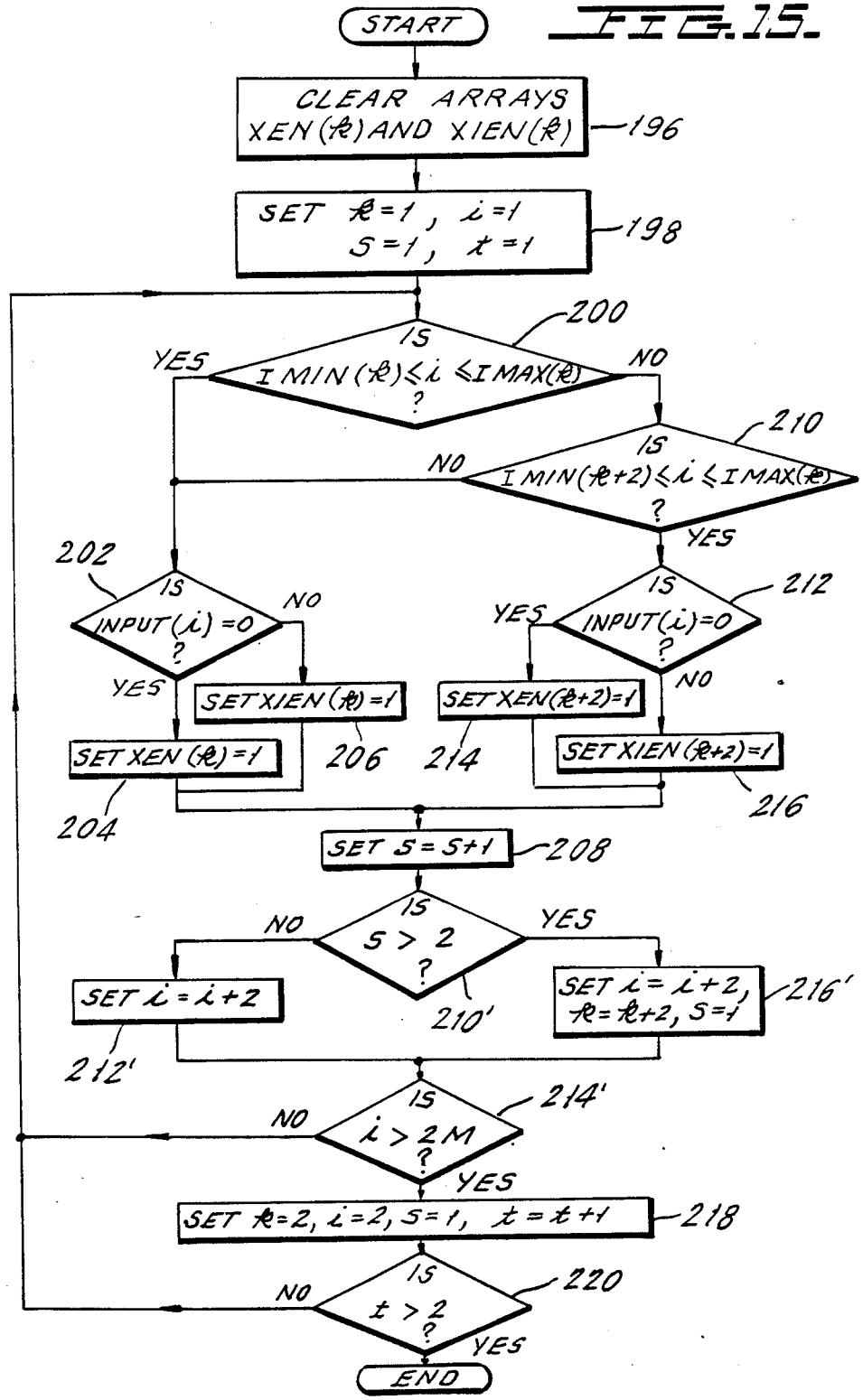
FIG. 15 is a flow diagram of a computer program which can be used to generate the arrays X(k) and X1(k) illustrated by way of example in FIG. 12.

The conversion signals XEN(k) and X1EN(k) stored in the line rate conversion table of FIG. 10 control the read operation of buffers 16, 18 in a manner which fulfills these requirements. One possible computer program for generating similar conversion signals which meet this requirement for conversion ratios other than the 5 to 3 ratio being considered is shown in FIG. 15 and will be described below.

In accordance with the conversion table illustrated in FIG. 10, the signal XEN(k) is at the binary "1" level during the generation of each output line (lines 1, 3 and 5) of an odd field and the signal X1EN(k) is at the binary "1" during the generation of the first and third output lines (lines 1 and 5) of an odd field output group. This is illustrated in FIG. 7. The signals are used to gate the read enable signal REN (FIG. 5) via AND gates 110, 112 with the result that the x section read enable signal XREN is generated whenever an input line stored in the x section of the read input buffers 16, 18 is to be applied to the arithmetic unit 22 and the x+1 section read enable signal X1REN is generated whenever an input line stored in the x+1 section of the read input buffers 16, 18 is to be applied to arithmetic unit 22.

The count in counters 106 and 108 is reset by the end of output group signal EOG insuring that the count in counters 106 and 108 is initialized at the beginning of each output group. The count in counters 106 and 108 is thereafter increased at the clock rate CL2 (the rate at which pixels are read out of the read input buffers 16, 18 into arithmetic unit 22) whenever a binary "1" signal appears at its respective enable input. As such, the count in counters 106, 108 are increased only when the x section read enable signal XREN and x+1 section read enable signal X1REN are at the binary "1" level, respectively.

The x section and x+1 section read enable signals XREN and X1REN are applied to the enable input ENB of the x and x+1 sections of the read input buffers 16, 18 via the switching logic 56. Similarly, the x and x+1 read address signals XRADD and X1RADD are applied to the address input of the x and x+1 section of the write input buffers 16, 18 via the switching logic 56.

Figure 6:
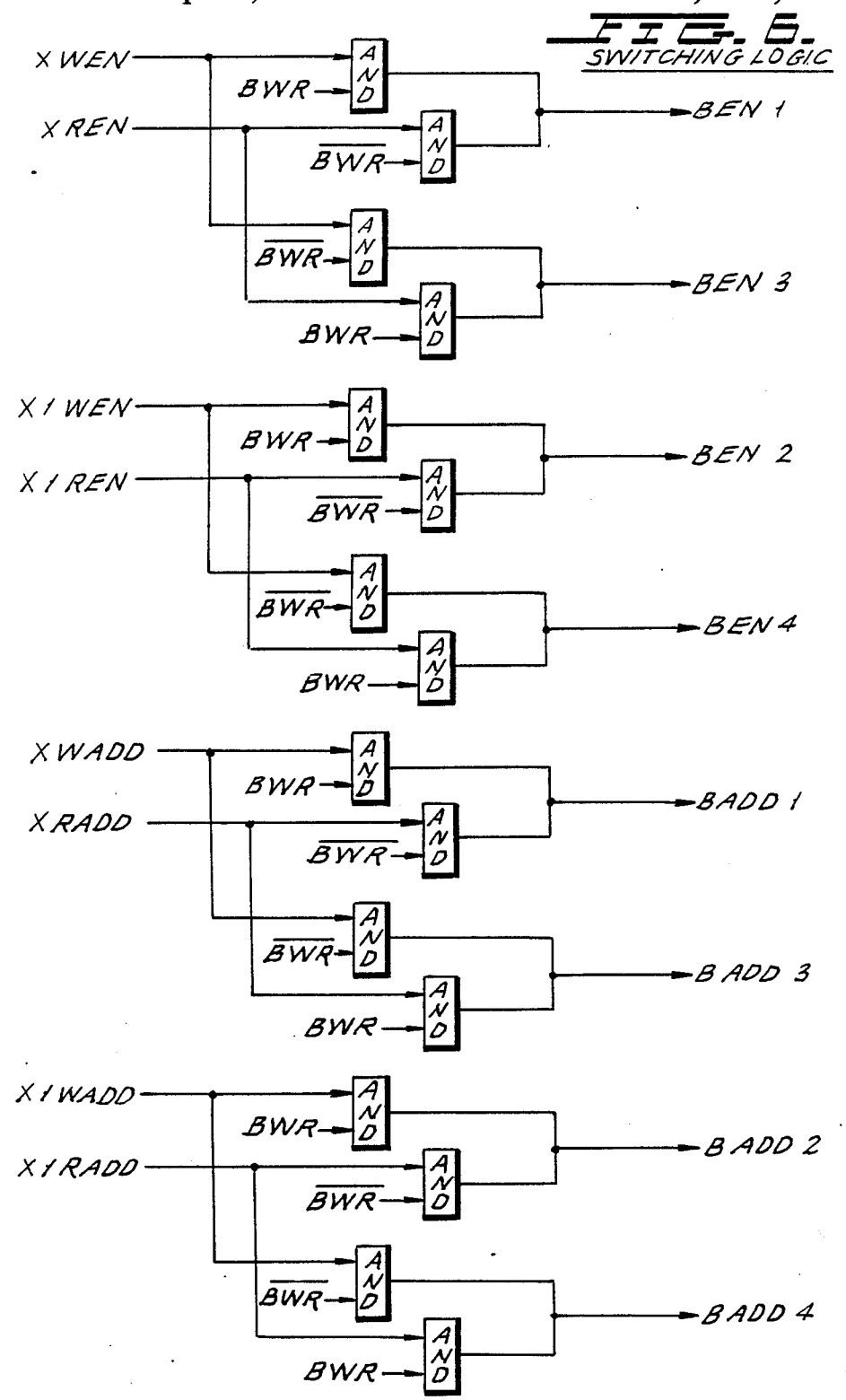
FIG. 6 is a block diagram of the switching logic of FIG. 4.

The structure of switching logic 56 is illustrated in FIG. 6 and is formed of a plurality of AND gates, all which are gated by either the buffer read/write signal BWR of the inverted signal BWR. The operation of this circuit will readily be understood by one of ordinary skill in the art and will not be described herein. It is sufficient to note that this circuit will steer the read control signals XREN, X1REN, XRADD and X1RADD to the read input buffers 16, 18 and will steer the write control signals XWEN, X1WEN, XWADD and X1WADD to the write input buffers 16, 18.

Having described the manner in which input pixels appearing at the output of A/D converter 14 are written into the input buffers 16, 18 and the manner in which the stored pixels are read out of the input buffers into the computational memory 24, a description of the manner in which these pixels are stored in the computational memory 24 and subsequently read out of the computational memory 24 into the arithmetic unit 22 will now be provided.

The operation of computational memory 24 is controlled by the computational memory address circuit 58 of the system controller 20 (FIG. 4). As shown in FIG. 8, address circuit 58 is broken up into two substantially identical subcircuits 114, 114'. The x section subcircuit 114 generates the address and enable signals CADD1 and CEN1 which are applied to the x section of computational memory 24. The x+1 section subcircuit 114' generates the address and enable signal CADD2 and CEN2 which are applied to the x+1 section of computational memory 24. The read/write signal for both subcircuits of memory 24 is the computational read/write signal CWR which is the inverted form of the clock signal CL2. The read/write signal CWR toggles between the binary "1" and the binary "0" level at twice the clock frequency CL2. The clock frequency CL2 defines the pixel period; the period during which pixels are transferred from the read input buffer 16, 18 to arithmetic unit 22. The read/write signal CWR divides the pixel period into two equal portions as shown in FIG. 9. During the first portion, memory 24 is operated in the read mode. Data stored in the x and/or x+1 sections of computational memory 24 are read onto lines 32 and/or 34, respectively, if such data is required to generate the present output pixel (this is determined by enable signal CEN1 and CEN2, respectively). During this portion of the pixel period, the clock signal CL2 is at the binary "1" level and the output line pixel appearing at the output of adder 26 is read into FIFO output buffer 48.

During the second half of the pixel period, the data input to FIFO output buffer 40 is disabled and the x and x+1 sections of memory 24 are placed in the write mode. In this mode, the appropriate pixel information appearing at the output of multipliers 38 and 40 are written into memory 24 if such information is required to be stored for later use (again, this is determined by enable signals CEN1 and CEN2). As should be clear from the foregoing, the operation memory 24 switches between a read and write operation during each pixel period. As such, both the x section 114 and the x+1 section 114' of computational memory address circuit 58 are divided into a write section 118 and a read section 120.

The structure and operation of subcircuits 114 and 114' are identical except that they receive different input signals (section 114 receiving signals WX(k) and RX(k) and section 114' receiving signals WX1(k) and RX1(k)). The elements of subcircuit 114' are identical to subcircuit 114 and are denoted by the use of a "prime". For simplicity of description, only the structure and operation of section 114 will be described below.

The read section 118 receives the write enable signal WX(k). The write enable signal WX(k) is generated by memory 60 and stays at a constant value during the generation of all pixels of an output line Fq(k). This signal is gated by the read/write signal CWR appearing at the output of inverter 121 with the result that the x section write enable signal WXEN will be at the binary "1" level during the second half of each pixel period during the generation of output line F1(1). This signal is applied to OR gate 132 and defines x section enable signal CEN1 during the second half of each pixel period. It is also applied to inverter 124 which generates a positive going pulse whenever WXEN transitions from the binary "1" to the binary "0" level. This pulse is applied to the count input of x section write counter 126. The count in counter 126 defines the write address of the x section of computational memory 24. This insures that pixels to be stored in the x section of memory 24 are stored in sequential locations of the memory. Once counter 126 reaches its maximum count (this figure will be chosen to be at least as large as the maximum number of pixels to be stored in the x section of memory 24 during any single field), the counter will overflow and be reset to zero. This is acceptable since information is read out of the x section of memory 16 in the same order it is written into the memory. All that is required is that the read section 120 know the location of the first pixel written into the x section of memory 24 during the generation of the immediately preceeding output frame. The read section 120 will then begin generating read addresses sequentially beginning with that first pixel position. This is achieved through the use of a latch 128 as will be described below.

Since the count in counter 126 identifies the address at which the next pixel should be written into the x section of memory 24, the output of counter 126 is gated by the read/write signal CWR so that the count in counter 126 defines the x section address signal CADD1 during the second half of every pixel period. This signal appears at the output of OR gate 130. The inverter 124 generates an output pulse after WXEN returns to binary "0" to insure that the count in counter 126 is not incremented during the time interval in which its output is being gated by CWR and applied as the address signal CADD1.

During the generation of the first output line Fq(1), the write enable signal WX(k), and therefore the x section write enable signal WXEN, will remain at the binary "0" level during the entire time the output line Fq(1) is being generated (see FIGS. 9 and 10). This causes the enable signal CEN1 to be at the binary "0" level during the second half of each pixel period with the result that no additional pixel information is read into the x section of memory 24 and the count in counter 126 is not increased during the generation of output line Fq(1). During the generation of the output line F1(5), the write enable signal WX(k) remains at the binary "1" level and the x section write enable signal WXEN pulses to the binary "1" level during the second half of each pixel period (see FIGS. 9 and 10). As a result, a new pixel will be read into the x section of memory 24 during each pixel period and the count in counter 126 will be incremented by one during the first half of each pixel period and the pixels appearing at the output of multiplier 28 will be read into sequential positions in the x section of memory 24. The write section 118' of x+1 section subcircuit 116 operates in a substantially identical manner to control the write operation of the x+1 section of memory 24.

Since the read section 120 must control the operation of the computational memory 24 during the first half of each pixel period, it is gated by the clock signal CL2 rather than the read/write signal CWR. This signal is applied to AND gate 134 and gates the read enable signal RX(k) during the first half of each pixel period. During the generation of the first output line Fq(1), the enable signal RX(k) is at the binary "1" level with the result that the x section read enable signal RXEN will be at the binary "1" level during the first half of each pixel period (see FIGS. 9 and 10). The x section read enable signal RXEN is applied to OR gate 132 and will cause the enable signal CEN1 to be at the binary "1" level during the first half of each pixel period during the generation of output line Fq(1) and pixel information stored in the x section of memory 24 will be applied to arithmetic unit 22.

The enable signal RXEN is also applied to the inverter 136 which generates a plse at its output in response to the negative transition of RXEN. This signal is applied to the count input of the X read counter 138 and causes the count in counter 138 to increase by one shortly after the end of the first half of each pixel period. As a result, the count in counter 138 will identify successive pixel locations in the x section of memory 24 during the second half of each pixel period. This count is gated by clock pulse CL2 (via AND gate 146) and defines x section address signal CADD1 during the first half of each pixel period.

As noted above, the address of the first pixel to be read out of the x section of memory 24 during any given field is equal to the address of the first pixel written into the x section of memory 24 during the immediately preceeding field. To achieve this result, write section 120 includes a memory circuit 140 which stores the count in write counter 126 at the beginnng of the last output field (e.g., the even field) and places this count in x read counter 138 at the beginning of the present output field (e.g., the odd field). Memory circuit 140 includes a pair of one shots 142, 144 and a latch 128. The one shot 142 generates a single positive going output pulses in response to a positive transition of the new field signal NF after a time delay which is slightly greater than a single pixel period. This pulse is applied to the set input of latch 128 and causes latch 128 to store the count appearing at the output of x write counter 126. This count will be equal to the address of the first pixel written into the x section of memory 16 during the present output field. Before one shot 142 applies the set pulse to the count input of latch 128, the count in latch 128 will be equal to the count of counter 126 at the beginning of the immediately preceeding output field. This count is preset into x read counter 138 by the preset pulse appearing at the output of one shot 144. This pulse is generated in response to a positive transition of the new field signal NF after a time delay which is less than one pixel period to ensure that the count stored in latch 128 is read into the X read counter before a new count is latched into counter 128 by the set pulse appearing at the output of one shot 142.

Once the count stored in latch 128 is preset into x read counter 138, the count in counter 138 will thereafter be incremented by the count pulses appearing at the output of inverter 138. As a result, the count in x read counter 138 will define the read address of the x section of computational memory 24. The output of counter 138 is gated by the clock signal CL2 via AND gate 146 whose output is connected to OR gate 130. As a result, the x section address CADD1 will be equal to the instantaneous count in counter 138 during the first half of each pixel period. In a similar manner, the read section 120' of x+1 section subcircuit 114' will control the read operation of the x+1 section of memory 24.

At this point, the structure and operation of the converter circuit of FIG. 3 has been described. In the embodiment illustrated, the control signals set forth in the table of FIG. 8 are prestored in memory 60. A computer program which can be used to generated this information for substantially any conversion ratio (but using the linear interpolation method of the presently preferred embodiment) will now be described with reference to FIGS. 11–20.

Before the values of the control signals stored in memory 60 can be calculated, it is necessary to generate a series of equations relating an input group of M input lines Fp(1) to an output group of N output lines Fq(k). In the presently preferred embodiment, these equations will result in a linear interpolation of the input information into the output information as shown in FIG. 2. The flow diagram for producing these equations is illustrated in FIGS. 13A and 13B.

Beginning at block 147, the arrays TERM (k, i), IMIN(k) and IMAX(k) is cleared (all of its elements are set equal to zero). The array TERM (k, i) is a two-dimensional array which stores the coefficients of each term Fp(i) of each output line Fq(k). By way of example, output line Fq(1) in the example being considered includes the terms Fp(1) and $\frac{2}{3}$Fp(2). The coefficient of Fp(1) is 1 and will be stored in the element TERM (1,1) of the array TERM (k,i). The coefficient of the term Fp(2) is $\frac{2}{3}$ and will be stored in the element TERM (1,2) of the array TERM (k,i). The array IMIN(k) is a one-dimensional array which stores the line number of the lowest term of each output line Fq(k). Referring to FIG. 2, the lowest term of Fq(k) is one. As such, the first term of IMIN(k) will be set equal to one. The lowest term of the output line Fq(2) is Fp(2). As such, the second term of IMIN(k) will be set equal to two, etc. The array IMAX(k) is a single-dimensional array which stores the line number of the highest term of each output line Fq(k). Referring to FIG. 2, the first element of IMAX(k) will be two, the second element will be four, etc.

Once the foregoing arrays have been cleared, the values of each of the elements must be generated for each output line Fq(k). These elements are calculated in the loop including blocks 150–176. Each time the program proceeds through this loop, it will generate the coefficients for each term of a single output line Fq(k) as well as the lowest and highest input line forming part of that output line. To initiate this process the program sets the output line variable k equal to one (block 148) with the result that the coefficients of the terms of the output line equation for Fq(1) will be generated. The variable k will be incremented during each subsequent pass through the loop until all the required coefficients have been generated.

Returning to block 148 of FIG. 13A, the output line variable k is set equal to one. This causes the output line Fq(1) to be generated during the first pass through the loop. Proceeding to block 150, the lowest term variable A is set equal to the smallest integer greater than or equal to [(k−1)M/N] wherein M is the number of lines in an input group and N is the number of lines in an output group. The variable A is equal to the lowest input line Fp(1) which defines part of the kth output line Fq(k) being generated. Proceeding to block 152, the highest term variable B is set equal to the lowest whole number greater than [(k)M/N]. The variable B is equal to the highest input line Fp(l) which forms part of the kth output line Fq(k) being generated. If the first output line is being generated (k=1), A will equal 1 and B will equal 2. As shown in FIG. 2, this corresponds to the terms Fp(1) and Fp(2) in the output equation for Fq(1).

Proceeding to block 154, the input line variable l is set equal to the lowest term variable A and the kth element of the array IMIN(k) is set equal to i. The coefficient of the first term in the output Fq(k) is then calculated in block 156 in accordance with the equation:

$$\text{TERM}(k,l) = \frac{lN - (k-1)M}{N} \qquad \text{Eq. (1)}$$

In decision block 158, a determination is made as to whether the input line variable i is equal to B−1. If it is, the input line variable l is increased by one (block 166) and the coefficient of the next term in the output equation Fq(k) is generated (block 168) in accordance with the following equation:

$$\text{TERM}(k, l) = kM/N - (l-1) \qquad \text{Eq. (2)}$$

The program then proceeds to block 170 (FIG. 13B) wherein the kth element of the array IMAX(K) is set equal to i.

Returning to decision block 158, if the input line variable i is not equal to B−1, the input line variable i is increased by one (block 160) and the coefficient of the next term of the equation Fq(k) is set equal to 1 (block 162). Proceeding to decision block 164, a determination is made if A+1 is less than or equal to B−1. If it is, the program proceeds to block 166 wherein the input line variable i is incremented by one and the next term of Fq(k) is generated in accordance with Eq. (2), supra (block 168). The program then proceeds to instruction block 170.

When the program reaches block 170, it will have generated the coefficient for each term of output line Fq(k). These terms are combined to create the equation for output line Fq(k) in block 172 in accordance with the following equation:

$$Fq(k) = \frac{N}{M} \sum_{l=A}^{l_{max}} \text{TERM}(k,l) Fp(l) \qquad \text{Eq. (3)}$$

Having generated the output equation for the kth output line, the program must generate the next equation for the succeeding output line of an output group. To this end, the program proceeds to block 174 wherein the output variable k is increased by one. The program then returns to block 150 (k will not be greater than the N-block 176) and generates the coefficients for Fq(2). The program will continue to loop through blocks 150–176 until all output lines of an output group have been generated (k will then be greater than N) at which time subroutine is completed.

Figure 14:
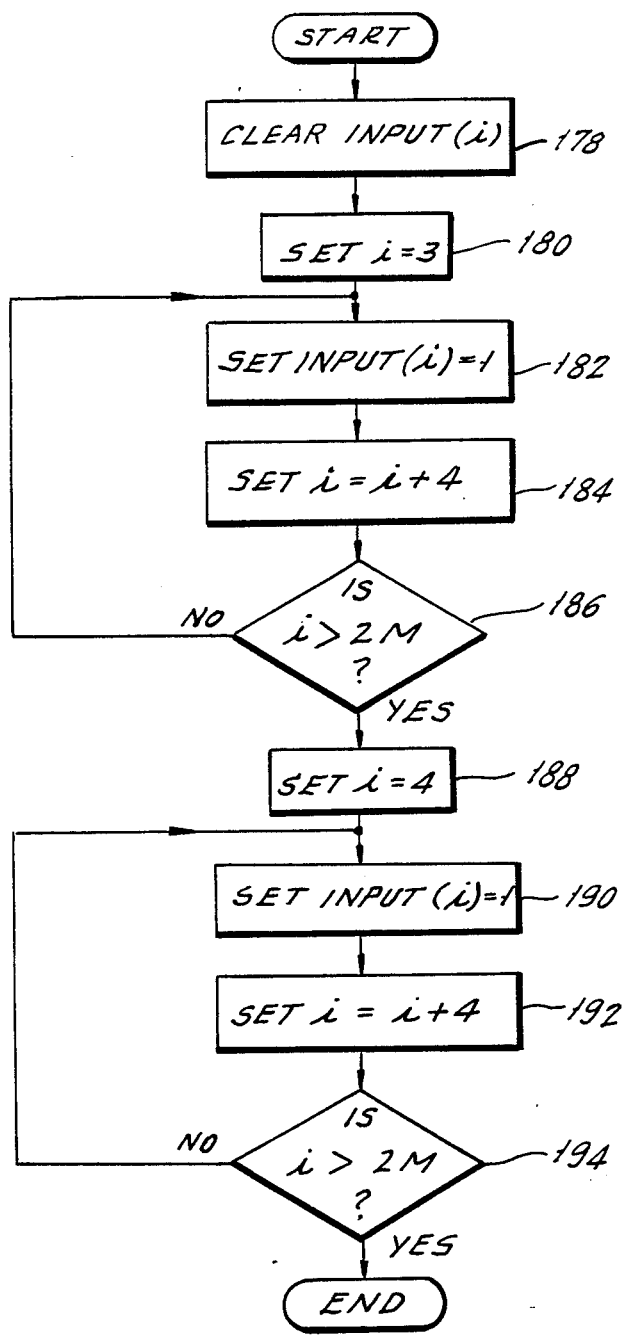
FIG. 14 is a flow diagram of a computer program which can be utilized to generate the array in INPUT(l) illustrated by way of example in FIG. 11.

Once the foregoing equations have been generated, the control signals XEN(k) and X1EN(k) must be generated and stored. The signals determine whether an input line stored in the x and x+1 sections of the read input buffer, respectively, are to be applied to lines 36 and 40 (FIG. 3), respectively, during the generation of the kth output line. The first step in generating these signals is to determine which input lines are stored in the x section of the input buffers 16, 18 and which input lines are stored in the x+1 section of the input buffers 16, 18. This information is stored in an array INPUT(i), each of whose terms indicates whether the ith input line is stored in the x or the x+1 section of the read input buffers 16, 18. Each term of the array INPUT(l) which is set at the binary "1" level will indicate that the input line corresponding to that term is stored in the x section of the input buffers 16, 18. Each term of INPUT(i) which is set at the binary "0" level will indicate that the input line corresponding to that term is stored in the x+1 section of read input buffers 16, 18. A simple program for computing this array is illustrated in FIG. 14.

Beginning with block 178, the array in INPUT(i) is cleared (all of the elements are set equal to zero). In the preferred embodiment of the invention, every other input line of an odd input field is stored in the x+1 section of the input buffers 16, 18. As such, the second, fourth, etc., input line of an odd field (i.e. the third, seventh, etc., input line of an entire frame) is stored in the x+1 section of the input buffers 16, 18. The appropriate elements of the array INPUT(i) corresponding to the odd field are set equal to one in blocks 180–184 of FIG. 14 starting with the element INPUT(3) and continuing with every fourth element of INPUT(i) until i becomes greater than 2N.

In addition to the foregoing elements of an odd field, the second, fourth, etc., elements of an even field are aso stored in the x+1 section of the buffers 16, 18. These elements of the even field correspond to the fourth, eighth, etc. elements of the overall frame. These elements of the array INPUT(i) are set equal to one in blocks 188–194 of FIG. 14 up until the element i is greater than 2N. Those elements which are not stored in the x section are stored in the x+1 section of the buffer. Since the elements of INPUT(i) which are not set equal to 1 in the routine of blocks 180–194 remain set at zero (they are set equal to zero in block 178), the array INPUT (i) properly identifies the location of all of the input lines. The information stored in array INPUT(i) for the five to three conversion being considered herein is shown in FIG. 11.

Having calculated the array in INPUT(i), the array in XEN(k) and X1EN(k) corresponding to the control signals XEN(k) and X1EN(k) must be generated. This is done in accordance with the program illustrated in FIG. 15.

Beginning with instruction block 196, the program clears the arrays XEN(k) and X1EN(k). The output and input line variables k and i are both set equal to one as are the term variable s and the field variable t (block 198). As described above, every output line can be formed of up to 2 input lines of the same field, these input lines being stored in the read input buffers 16, 18. There are always consectuive lines of a field. The software must examine each output equation (FIG. 2)

twice, once for each of the two possible input lines which may form terms of the output line equation. To this end, the term variables s indicates whether the output equation is being examined a first or a second time. When the term variable s is set equal to "1" it indicates that the output equation is being examined for the first time. When it is set equal to "2", in indicates that the output equation is being examined for a second time.

The software described below examines each output equation field by field. That is, it first examines the equations for the odd field output lines and then examines the equations for the even field output lines. The field variable t keeps track of which field is being examined. When the field variable t is set equal to "1", indicates that the odd field is being examined. When it is set equal to "2", it indicates that the even field is being examined.

Having set the variables in block 198, the program proceeds to decision block 200 wherein it determines if the kth output line is a function of the ith input line (FIG. 2). Since the variables k and i are both equal to one, block 200 initially determines if the output line Fq(1) is a function of the input line Fp(1). Since the arrays IMIN(k) and IMAX(k) (see the description of FIGS. 13A and 13B, supra) store the lowest and highest input line which forms part of the equation for the output line k, this can be determined in accordance with the following equation:

$$IMIN(k) \leq i \leq IMAX(k) \qquad \text{Eq. (4)}$$

If the kth output line is a function of the ith input line, it must be applied to arithmetic unit 22 during the generation of the kth output line. It must be determined, however, if the ith input line is stored in the x or the x+1 section of the read input buffers 16, 18 so that the kth element of the array XEN(k) or X1EN(k) can be set equal to one. To this end, the program proceeds to decision block 202 and determines if the ith element of the array INPUT(i) is equal to zero. If it is, this indicates that the ith input line is stored in the x section of the read input buffers 16, 18 and the programs sets the kth element of the array XEN(k) equal to one (block 204). If the ith element of INPUT(i) is not equal to zero, this indicates that the ith input line is stored in the x+1 section of the read input buffers 16, 18 and the program sets the kth element of X1EN(k) equal to one (block 206). The program then proceeds to block 208.

Returning to decision block 200, if the kth output line is not a function of the ith input line, the program proceeds to decision block 210 wherein the program determines if the (k+2)th output line is a function of the ith input line in accordance with the following equation:

$$IMIN(k+2) \leq i \leq IMAX(k) \qquad \text{Eq. (5)}$$

If it is not, the ith input line must be applied to the arithmetic unit 22 during the generation of the kth output line and the program proceeds through blocks 202-206 as described above. If the (k+2)th output line is a function of the ith input line, the ith input line must be applied to arithmetic unit 22 during the generation of the (k+2)th output line. A determination must be made, however, whether the ith input line is stored in the x or the x+1 section of the read input buffers 16, 18 so that the (k+2)th element of the arrays XEN(k) or X1EN(k) may be set equal to one, respectively. To this end, the program proceeds to decision block 212 which determines if the ith element of the array INPUT(i) is equal to zero. If it is not, this indicates that the ith input line is stored in the x section of the read input buffers 16, 18 and the program proceeds to instruction block 214 wherein the (k+2)th element of XEN(k) is set equal to one. If the ith element of INPUT(i) was not equal to zero, the program proceeds to instruction block 216 and sets the (k+2)th element of X1EN(k) equal to one. The program then proceeds to instruction block 208.

At this point in the program, the kth output line has been examined to determine if it is a function of the first input line being considered (e.g. the input line Fp(1)). It must be examined a second time to determine if it is a function of the next input line of the same field (e.g. input line Fp(3)). To this end, the term variable s is incremented by one in instruction block 208. The program then proceeds to decision block 210' wherein it determines if s is greater than two. If it is not, the program proceeds to instruction block 212' and increases the input line variable i by two (so that the next input line of the field being considered may be examined). The program then proceeds to decision block 214' and determines if the ith input line is greater than 2N (twice the number of lines in an input group). If it is not, the program loops back to decision block 200 and the process described above is repeated.

Returning to decision block 210', if s is greater than two (indicating that the kth output line has been examined to determine if it is a function of two different input lines), the program proceeds to decision block 216' wherein the input variable i is incremented by two, the output variable k is incremented by two and the term variable is set equal to 1. This will cause the program to examine the next output line of the field presently being examined. The program will continue to loop through blocks 200-216' until all input lines of the odd field have been considered. Once this is done, the input line variable i will be greater than 2N and the program will proceed to instruction block 218 wherein the input and output line variables k and i will be set equal to two, the term variable s will be set equal to one and the field variable t will be incremented by one. The program will then loop through elements 200-216' until all of the output lines of the even field have been examined (this will be indicated by the fact that the input variable i will be greater than 2N). At that point, the field variable t will be increased to three and the program will proceed to decision block 220. Since t will be greater than two, the subroutine ends.

Having generated the arrays XEN(k) and X1EN(k), the program must now generate the arrays Ka(k), Kb(k), Kc(k) and Kd(k) which correspond to the coefficients Ka(k), Kb(k), Kc(k) and Kd(k), respectively. This is carried out in accordance with the flow diagrams of FIGS. 16 and 17.

The first step in this process is the generation of the input buffer section arrays X(v) and X1(v). Each element of the array X(v) indicates the input line which is read out of the x section of the read input buffers 16, 18 and applied to the computational memory 22 during the generation of the vth output line. Similarly, each element of the array X1(v) stores the number of the input line which is applied from the x+1 section of the read buffers 16, 18 to the arithmetic unit 22 during the generation of the vth output line. By way of example, input lines 1 and 3 are applied from the x and x+1 sections of the read input buffers 16, 18, respectively, and applied to the computational memory 22 during the generation of the first output line Fq(1). As a result, the first element of X(v) is set equal to one and the first element of X1(v) is set equal to three. The values stored in these arrays for the five to three conversion being considered is illustrated in FIG. 12.

Figure 16:
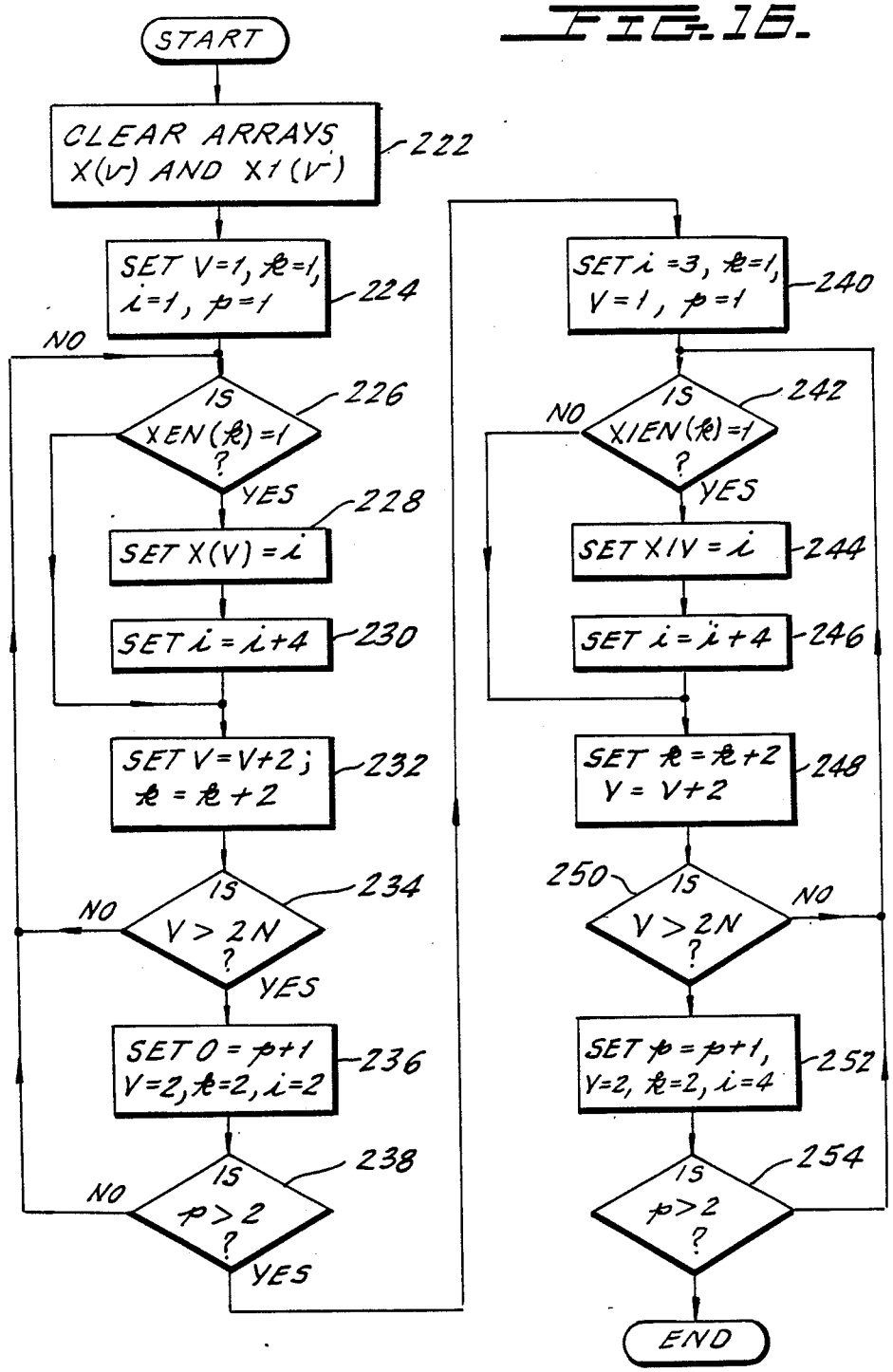
FIG. 16 is a flow diagram illustrating a computer program which can be used to generate the arrays XEN(k) and X1EN(k) illustrated by way of example in FIG. 10.

The flow chart for generating these arrays is illustrated in FIG. 16. Beginning with instruction block 222, the arrays X(v) and X1(v) are cleared (all their elements are set equal to zero). Proceeding to instruction block 224, the input buffer output line variable v is set equal to one, the output line variable k is set equal to one, the input line variable i is set equal to one and the loop pass variable p is set equal to one. The variable p indicates whether the program is making a first or second loop through the subroutine, including elements 226-238. During the first pass through this loop, the odd field input lines are examined. During the second pass through this loop, the even field input lines are examined.

Proceeding to decision block 226, the program determines if the kth element of the array XEN(k) is equal to one. If it is, this indicates that an input line is read out of the x section of the read input buffers 16, 18 and applied to the arithmetic unit 22 during the generation of the kth output line. Assuming that this is the first pass through the loop, k will be equal to one and the first line stored in the x section of the read input buffers 16, 18 is to be applied to the arithmetic unit 22. As such, the first element of the input buffer section array X(v) should be set equal to one. This is done in instruction block 228 wherein X(v) is set equal to i. The program then proceeds to instruction block 230 wherein the input variable i is incremented by four, thereby identifying the second input line stored in the x section of the read input buffers 16, 18. The program then proceeds to instruction block 232.

Returning to decision block 226, if the first element of XEN(k) is not equal to one, this indicate that no input line is read from the x section of read input buffers 16, 18 to arithmetic unit 22 during the generation of the kth output line with the result that the vth element of array X(v) should remain at zero. As such, the program proceeds directly to instruction block 232.

In instruction block 232, the input buffer output line variable v and the output line variable k are both incremented by two to identify the next output line of the field being examined. The program then proceeds to decision block 234 and determines if v is greater than 2N. If it is not, additional output lines must be examined and the program returns to decision block 226. The program continues to loop through blocks 226-234 until all elements of the odd field have been examined. At that time, v greater than 2N and the program proceeds to instruction block 236 wherein the pass variable p is incremented by one and the variables v, k and i are all set equal to two to initiate examination of the even field output lines. The program then proceeds to decision block 238 to determine if the loop pass variable p is greater than two. If it not, the program returns to instruction block 226 and passes through the loop including blocks 226-234 until all of the even field output lines have been examined. At that point, the loop pass variable p will be set equal to three in block 236, the equality set forth in block 238 will be true and the program will proceed to instruction block 240. Subroutine including blocks 240-254 is substantially identical in operation to that described with respect to blocks 224-238 except that it examines the input line stored in the x+1 section of the read input buffers 16, 18. Since the operation of this subroutine is substantially identical to that described above, it will not be described herein.

Figure 17A:
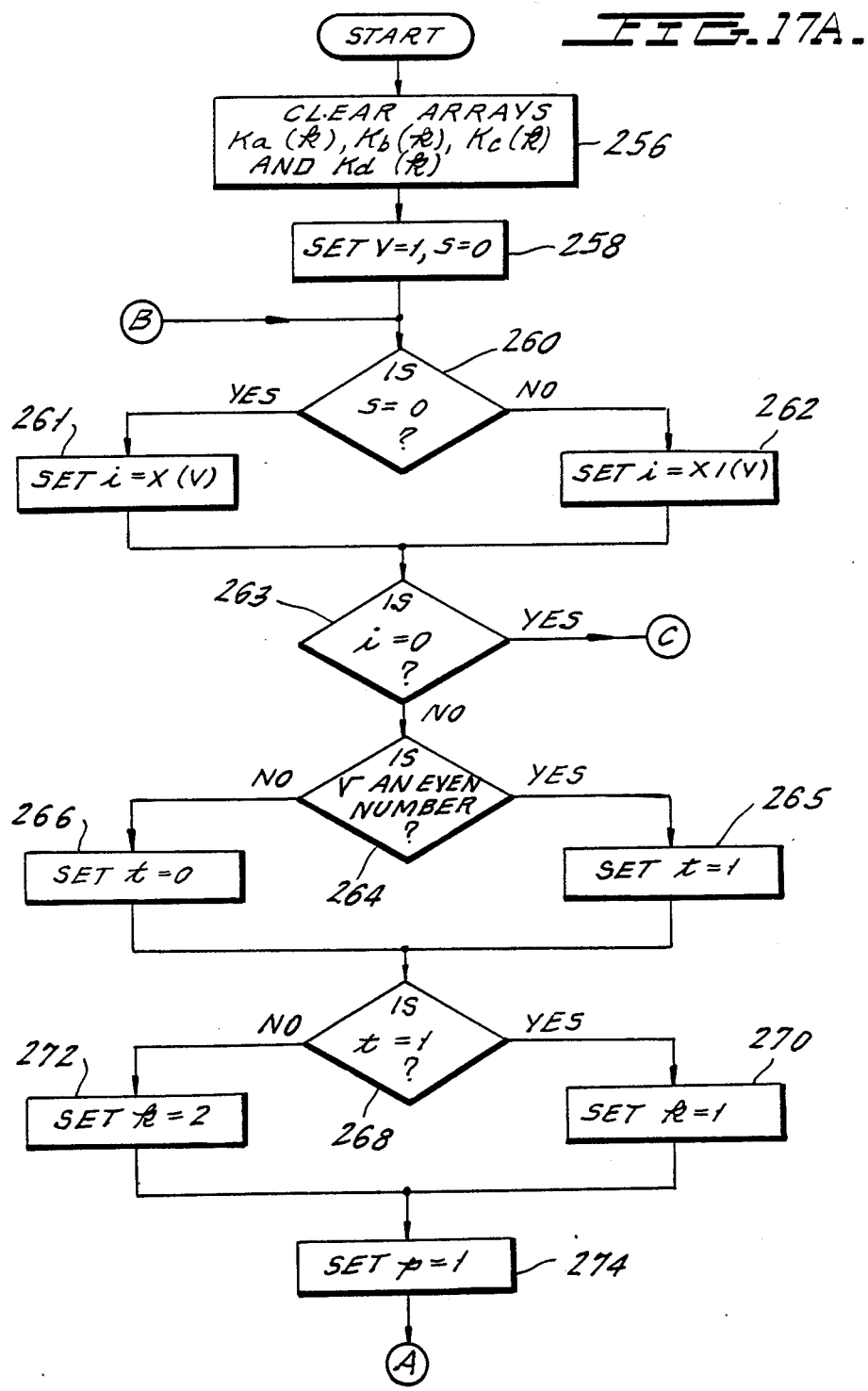
FIGS. 17A-17C are flow diagrams illustrating a computer program which can be utilized to generate the coefficient arrays Ka(k), Kb(k), Kc(k) and Kd(k) illustrated by way of example in FIG. 10.
Figure 17B:
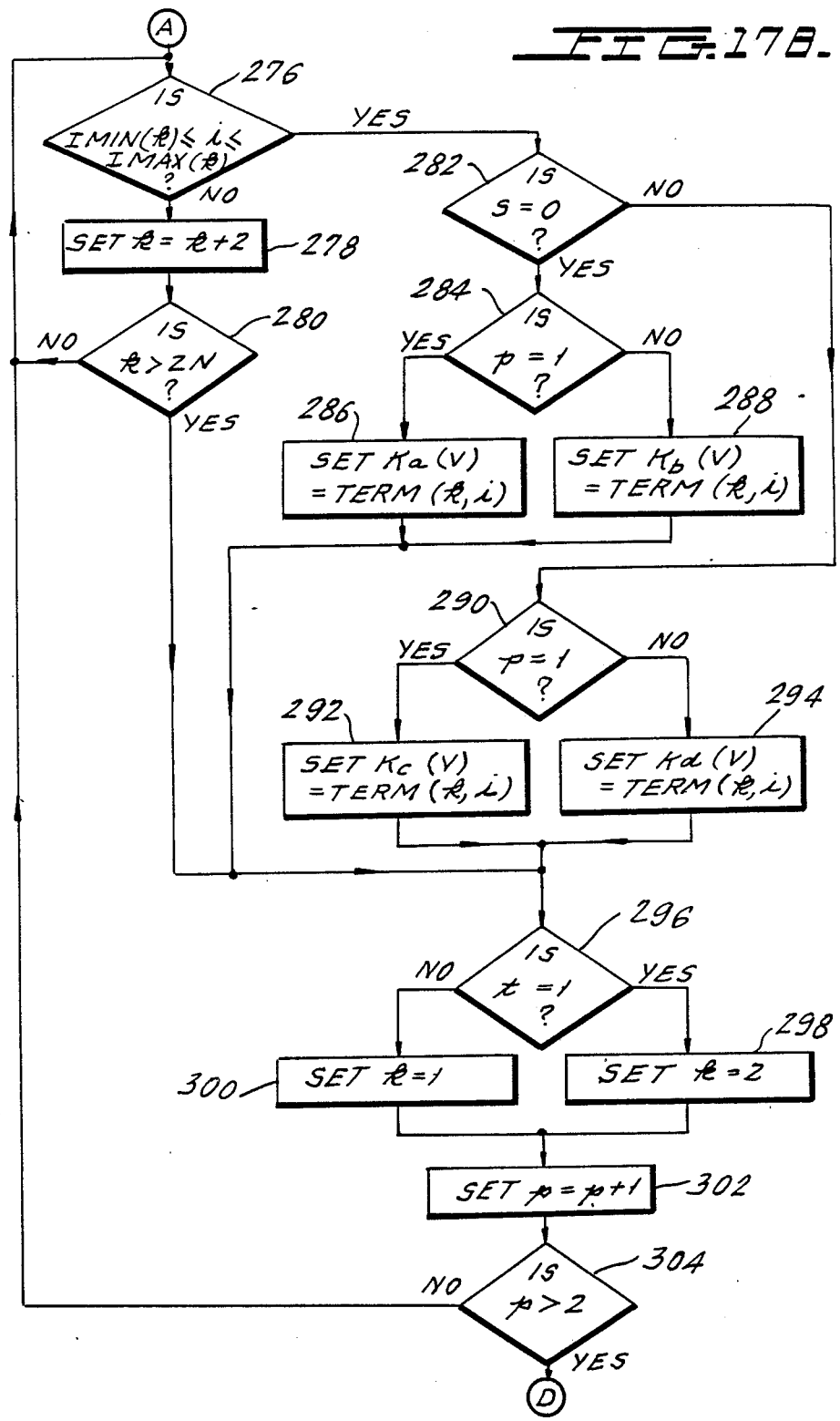

Having generated the arrays X(v) and X1(v), the program proceeds to the subroutine illustrated in FIGS. 17A and 17B to generate the arrays Ka(k), Kb(k), Kc(k) and Kd(k). These arrays are initially cleared in instruction block 256. The input buffer output lines variable v is set equal to one and the buffer section variable s is set equal to zero (block 258). The input buffer output line variable v identifies the element in arrays X(v) and X1(v) being examined. The buffer section variable s indicates whether the subroutine is examining the x or x+1 section of the read input buffers 16, 18. The variable s will be set equal to zero when the x section of the read input buffers 16, 18 is being examined and will be set equal to one when the x+1 section is being examined.

Proceeding to block 260, the program examines the buffer section variable s to determine if the x or x+1 section of the read input buffers 16, 18 is being examined. If the x section is being examined, the input line variable i is set equal to the vth element of the array X(v) (block 261). If the x+1 section of the read input buffers 16, 18 is being examined, the input line variable i is set equal to the vth element of X1(v) (block 264).

Figure 17C:
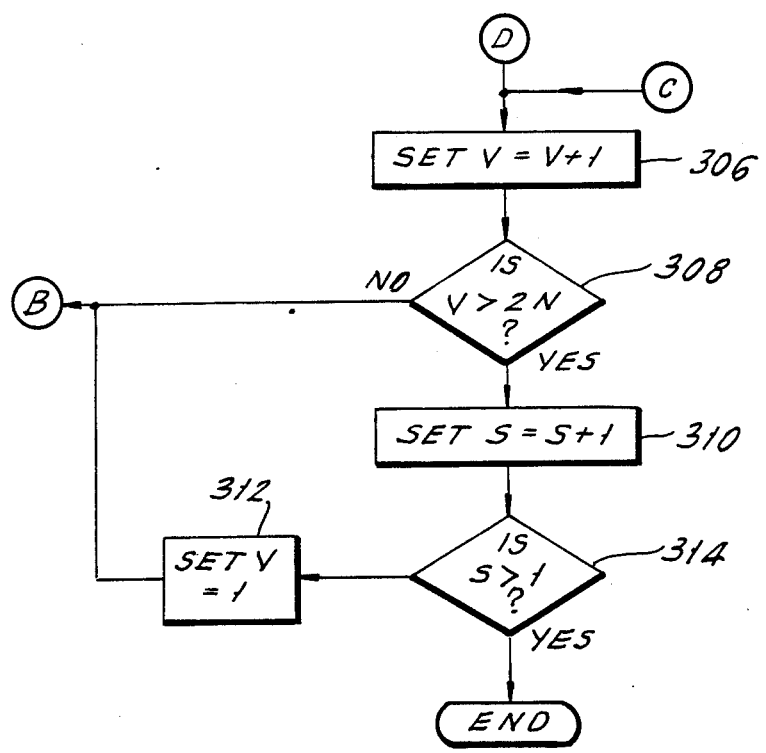

The program then proceeds to decision block 266 which determines if i is equal to zero. If it is, the program proceeds to instruction block 306 (FIG. 17C). If it is not, the program proceeds to decision block 263 and determines if r is an even number. If it is, the program sets the field variable t equal to one (block 265); if it not, the program sets the field variable t equal to zero (block 266). It is important to keep track of the field of the output line Fq(k) being considered since input lines Fp(i) of the same field are immediately used to generate the output field and thereby control the value of arrays Kb(k) and Kd(k) while input lines Fp(i) of the opposite field are stored in the computational memory 22 for further use and thereby control the values of the arrays Ka(k) and Kc(k).

The subroutine including blocks 276-304 is used to determine which output lines Fq(k) are a function of the input line Fp(i) identified in blocks 261 or 262 and to set the value of the appropriate elements of the arrays Ka(v), Kb(v), Kc(c) and Kd(v) accordingly. During the first pass through this subroutine, the output lines Fp(k) which are the opposite field of the input line Fp(i) identified in block 261 or 262 are examined. Once the program identifies the output line Fq(k) which is a function of the input line Fp(i) in question, it sets the appropriate value of the kth element of Ka(k) if the input line being examined is stored in the x section of read input buffers 16, 18 and sets appropriate value of the kth element of Kc(k) if the input line being considered is stored in the x+1 section of the read input buffers 16, 18. During the second pass through the subroutine, including elements 276-304, the program examines the output lines Fq(k) which are part of the same field as the input line Fp(i) identified in block 261 or 262 and sets the appropriate value of the array Kb(k) or Kd(k), accordingly.

Once the value of the field variable t has been set in blocks 265 or 266, the program proceeds to decision block 268 and examines the field variable t to determine if v is part of an odd field or an even field. If it is part of an odd field, the program sets the output line variable k equal to one so as to ensure that the odd field output lines will be examined first (block 270). If v is part of an odd field, the program sets the output line variable k equal to two so as to ensure that the even field output lines will be examined first (block 272). In either case, the program then proceeds to block 274 wherein it sets the pass variable p equal to one indicating that a first pass is being made through the loop including elements 276–304.

In instruction block 276 (FIG. 17B), the program determines if the input line Fp(i) identified in block 261 or 262 is a function of the kth output line. This may be done by examining the equality set forth in Eq. (4), supra. If it is not, the output variable k is incremented by two (block 278) and the program proceeds to decision block 280 wherein it determines if k is greater than 2N. If it is not, there are additional output lines to be examined and the program returns to block 276. If it is, all of the output lines have been considered and the program proceeds to block 296.

Returning to block 276, if the input line Fp(i) is a function of one of the odd field output lines Fq(k), the program proceeds to decision block 282 and determines if the buffer section variable s is equal to zero. If it is, the program proceeds to decision block 284 and determines if the loop pass variable is equal to one. If the pass variable p is equal to one, a first pass is being made through the loop including elements 276–304 and the vth element of Ka(k) is set equal to TERM(k, i) (block 286). If a second pass is being made through the loop, the vth element of Kb(k) is set equal to TERM(k, i) (block 288).

Returning to decision block 282, if the buffer section variable s is equal to one, the program proceeds to decision block 290 and determines if a first or second pass is being made through the loop. If a first pass is being made through the loop, the vth element of Kc(k) is set equal to TERM(k, i), (block 292). If a second pass is being made through the loop, the vth element of Kd(k) is set equal to TERM(k, i) block 294).

Once the program has proceeded through blocks 276–294, it will have identified the output line of the field being examined (if any) which is a function of the input line Fp(i) identified in block 261 or 262 and will have set the appropriate value of arrays Ka(k), Kb(k), Kc(k) and Kd(k) accordingly. At this point, a second pass must be made through blocks 276–294 to determine the output line (if any) of the opposite field which is a function of the input line Fp(i) identified in block 261 or 262. To this end, the program proceeds to block 296 to determine if an odd or an even field had just been considered. If an odd field had just been considered, it is necessary to examine the even field and the output line variable k is set equal to two in block 298. If an even field had previously been examined, the output line variable k is set equal to one (block 300). The program then increases the pass variable p by one (block 302) and determines if p is greater than 2. If not, the program returns to decision block 276 and begins a second pass through the loop including elements 276–304. Once the second pass has been completed, the program will return to block 304, the pass variable p will be equal to three and the program will proceed to block 306 (FIG. 17C). At this point in the program, the vth element of the array X(v) will have been examined and the vth element of Ka(k), Kb(k), Kc(k) or Kd(k) will have been set equal to the appropriate value. In order to examine the next element of X(v), the program increments the input buffer output line variable v by one (block 306) and continues to loop through elements 260–308 until each element of X(v) has been examined. At this point in the program, each of the elements of Ka(k) and Kd(k) will have been set. At that point, v will be greater than 2N (block 308) and the program will proceed to block 322. It is now necessary to examine each of the input lines identified in X1(v). To this end, the buffer section variable s is incremented by one (block 322) and the input buffer output line variable v is set equal to one. The program then loops through elements 260–308 until all of the input lines identified in X1(v) have been examined. At this point, all of the elements of Ka(k), Kb(k), Kc(k) and Kd(k) will have been generated. The variable s is again incremented by one with the result that s will be greater than one (block 314) and the subroutine will be completed.

The final control signals of the conversion table (FIG. 10) which must be generated are the x section read and write enable signals WX(k), RX(k) and the x+1 section write and read enable signals WX1(k) and RX1(k). The signals indicate whether the pixels appearing on lines 36 and 42 (FIG. 3), respectively, are to be read into the x and x+1 sections of memory 24, respectively, and whether pixels stored in the memory 24 are to be read onto lines 32 and 34, respectively, during the generation of the kth output line. This information is stored in the arrays WX(k), RX(k), WX1(k) and RX1(k). Each element of these arrays indicate whether a pixel is to be written into or read out of the associated section of memory 24 during the generation of the kth output line. Each element will be set equal to "1" whenever a pixel is to be written into or read out of the associated section of the memory and will be set equal to a binary "0" when a pixel is not to be written into or read out of the respective section of the memory 24. Thus, the first element of the array WX(k) will be set equal to zero to indicate that information is not to written into the x section of memory 24 during the generation of the first output line while the first element of RX(k) is set equal to "1" to indicate that pixels are to be read out of the x section of memory 24 during the generation of the kth output line.

Figure 18A:
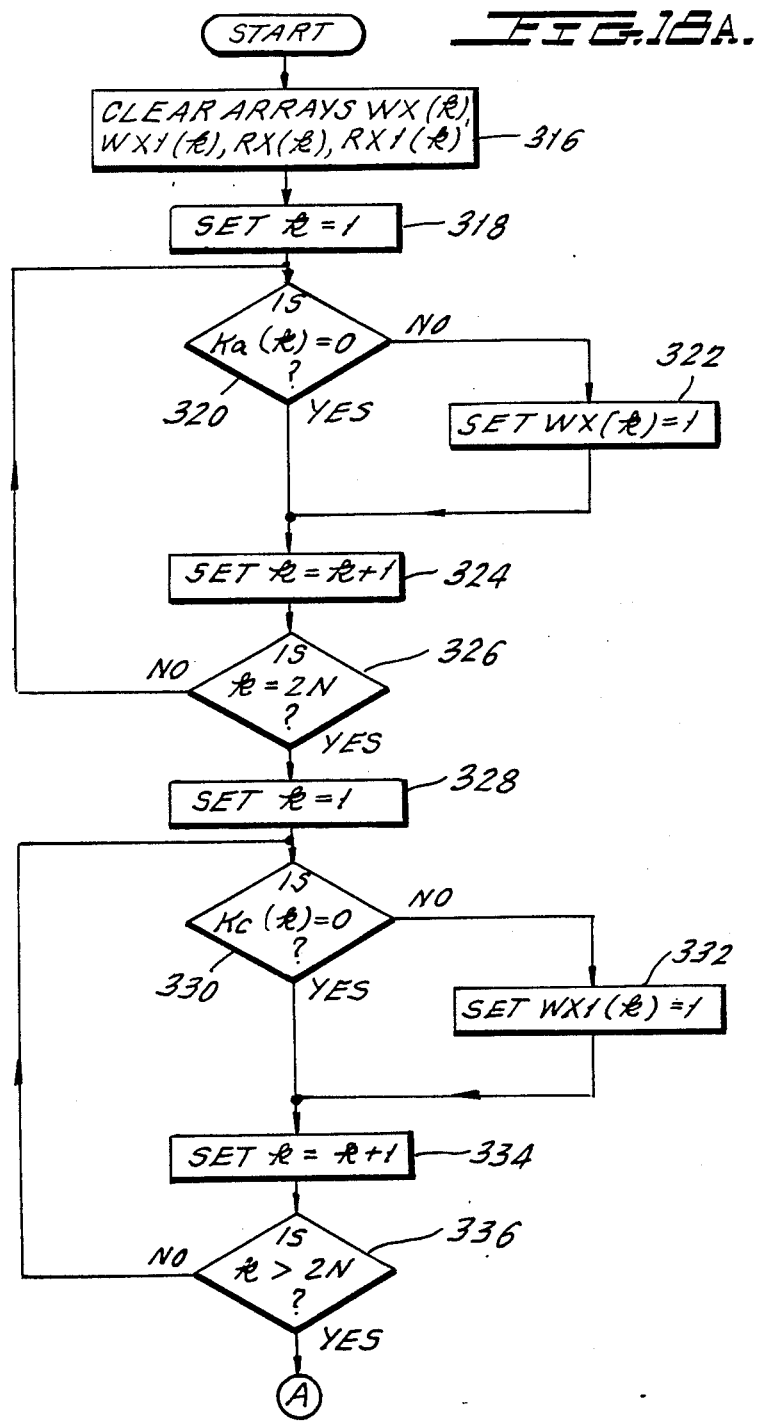
FIGS. 18A and 18B are a flow diagram of a computer program which can be used to generate the array WX(k), RX(k), WX1(k) and RX1(k) illustrated by way of example in FIG. 10.
Figure 18B:
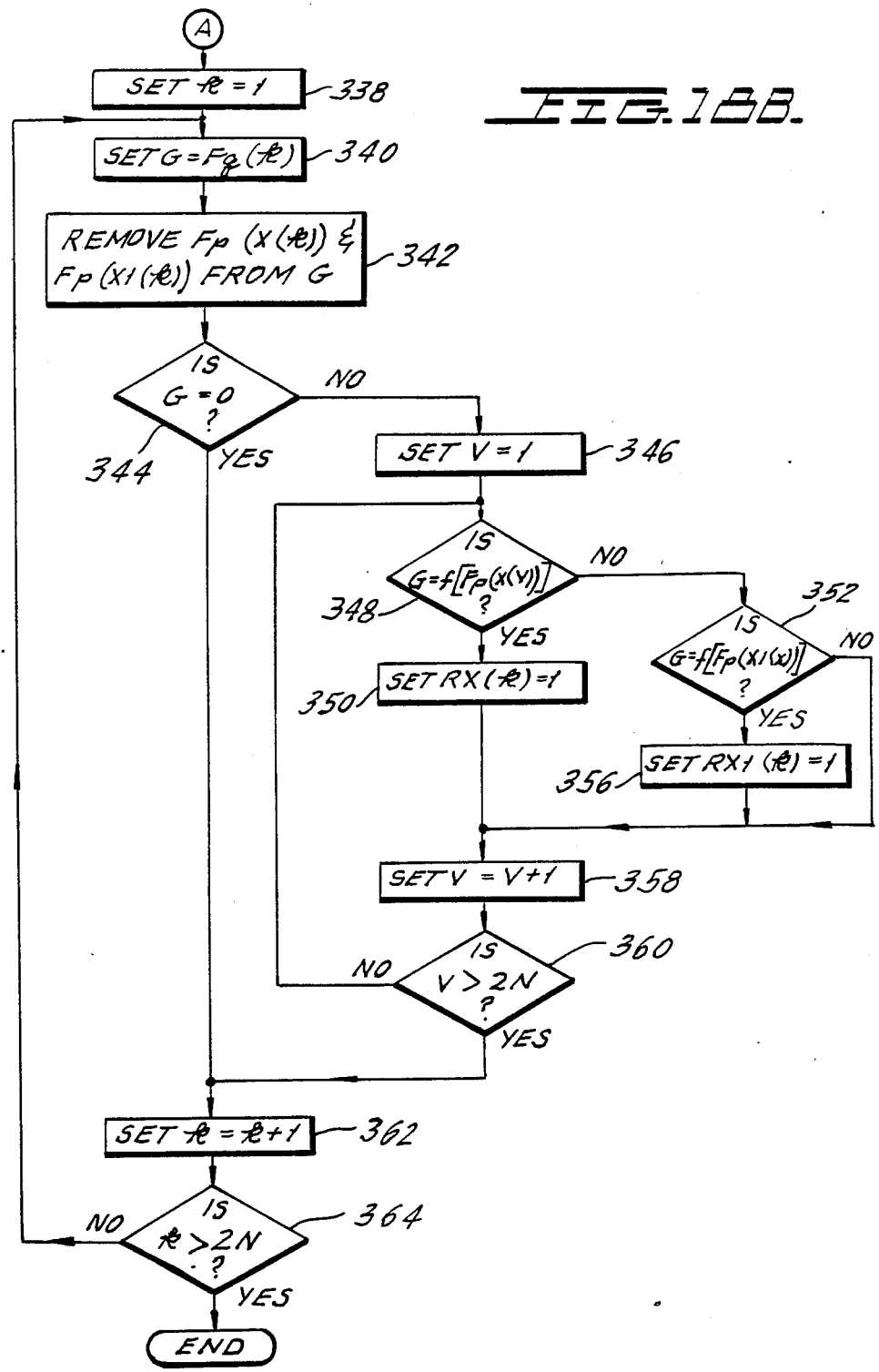

The program for setting the appropriate values of the foregoing arrays is set forth in FIGS. 18A and 18B. Beginning at block 316, the arrays WX(k), RX(k), WX1(k) and RX1(k) are cleared (all of their elements are set equal to zero). The program them proceeds to the loop including blocks 318–326 wherein each element of WX(k) which corresponds to an output line in which pixel information appearing at the output of multiplier 38 is written into the x section of memory 24 is set equal to one. While this could be done by examining the equations calculated in FIGS. 13A and 13B, the determination as to when information appearing at the output of multiplier 38 is to be written into the x section of computational memory 24 has already been made in the flow diagram of FIGS. 17A–17C. More particularly, whenever pixels appearing at the output of multiplier 38 was not to be written into the x section of memory 24, the corresponding element of the array Ka(k) was set equal to zero. Whenever pixels were to be written into the x section of memory 24, the associated element of the array Ka(k) was set equal to a fraction other than zero. For this reason, the loop including elements 318–326 merely examines each successive element of Ka(k) to determine if it is equal to zero (block 320). If it is not, the corresponding element of WX(k) is set equal to one (block 322). To make sure that each element of Ka(k) is successively examined, the program first sets k equal to one in block 318 and then increments the output line variable k by one each time the program passes through the loop (block 324) until the output line element is greater than 2N (block 326). At this point, all of the elements of Ka(k) will have been examined and the program proceeds to block 328.

Having determined the value of each of the elements of WX(k) in the subroutine including blocks 318–336, the program now sets the elements of the array WX1(k) in a substantially identical manner in the subroutine including blocks 328–336. Since the elements of WX1(k) indicate whether pixels are to be written into the x+1 section of memory 24 during the generation of the kth output line, the subroutine including elements 328–336 examines the elements of the array Kc(k) rather than Ka(k) and sets the corresponding elements of WX1(k) accordingly.

Once each of the elements of WX(k), WX1(k) has been set, the program will proceed to the subroutine including blocks 338–364 as illustrated in FIG. 18B. In this loop, the program will examine each output line Fq(k) if it is a function of an input line of the opposite field. If it is a function of an input line of the opposite field, the program then identifies that line and determines whether the identified line is stored in the x or the x+1 section of computational memory 24. If it is stored in the x section of memory 24, the program will set the appropriate element of the array RX(k) equal to one. If it is stored in the x+1 section of memory 24, the program will store the appropriate element of the array RX1(k) equal to one.

The program examines a single output line Fq(k) each time it passes through the loop including blocks 340–346. To initiate this process, the output line variable k is set equal to one in block 338. The program then proceeds to block 340 and sets the output equation variable G equal to the output line equation Fq(k). Since k is set equal to one, the output equation variable G will be set equal to 3/5[Fp(1)+⅖Fp(2)] (see FIG. 2). Since the program is only looking for input lines stored in computational memory 24, it removes elements which are stored in the read input buffers 16, 18 from the output equation variable G (block 342). Output line Fq(k) does not contain any input lines stored in computational memory 24, the output equation variable G will now be equal to zero and the values of the kth element of arrays RX(k) and RX1(k) should remain equal to zero (indicating that no pixels are to be read out of the x and x+1 section of computational memory 24 during the generation of the kth output line). The program determines if the output equation variable G is equal to zero in decision 344. If it is, the program increases the output line variable k by one (block 362) and returns to block 340 to examine the next output equation as long as k is not greater than 2N (block 364). If k is greater than 2N, this indicates that all of the output equations have been examined and the program is completed.

Returning to decision block 344, if the output equation variable G is not equal to zero, this indicates that the output line Fq(k) is a function of either one or two input lines Fp(i) which are stored in the computational memory 24.

To determine whether the input lines in question are stored in the x and/or x+1 section of computational memory 24, the program examines each of the input lines stored in the x and x+1 sections of computational memory 24 to determine if the stored input line forms part of the output line Fq(k) being generated. This is done in the subroutine including elements 346–360.

To initiate the process, the program sets the output line variable v equal to one (block 346) so that it will examine the first element of the input buffer section arrays X(v) and X1(v) to determine if the input lines identified by the vth element of those arrays makes up part of the output line Fp(k) being examined.

Proceeding to decision block 348, the program examines the output equation variable to determine if it is a function of the output lines stored in the first element of X(v). If it is, this indicates that the input line is stored in the x+1 section of memory 24 and the kth element of RX(k) is set equal to one (block 350). If it is not, the program proceeds to decision block 352 and determines if the output equation variable G is a function of the vth element of X1(v). If it is, this indicates that the input line forming part of the output line Fq(k) is stored in the x+1 section of memory 24 and the kth element of RX1(k) is set equal to one. If not, the program proceeds to block 358. At this point, the output line variable v will be incremented by one and the program will continue passing through the loop including elements 348–260 until all the elements of X(k) and X1(k) have been examined. At that time, the output line variable v will be greater than 2N (block 360) and the program will proceed to block 362 wherein the output line variable k will be increased by one and the program will examine the next output equation. This process continues until each output equation has been examined (at which point k will be greater than 2N—block 364). At this point, of the arrays RX(k) and RX1(k) will have been set to the proper value.

The present invention may be embodied in other specific forms without departing from the spirit or essential attributes thereof and, accordingly, reference should be made to the appended claims, rather than the foregoing specification, as indicating the scope of the invention.

What is claimed is:

1. A method for converting an input video signal comprising a plurality of input frames, each said input frame including an odd field and an even field, each input frame having P input lines, P being an integer much greater than one, into an input video signal comprising a plurality of output frames, each said output frame including an odd field and an even field, each output frame having Q output lines, Q being an integer much greater than one but different than P, said method comprising the steps of:
receiving said input video signal; and
generating said output video signal utilizing substantially all of the video information contained in said video input signal, said generating step generating each said output field as a function of an associated set of first and second input fields, and initiating the generation of each said output field after all of said first, but before all of said second, input field of said associated set of input fields has been received.

2. The method of claim 1, wherein said generating step utilizes a linear interpolation method to generate said output video signal wherein the video information contained in said input video signal is linearly distributed throughout said output video signal.

3. The method of claim 1, wherein each of said input frames is divided into a plurality of input groups each containing M input lines, M being an interger greater than one but much less than P, and wherein said generating steps initiates the generation of each said output field substantially immediately after the receipt of a first input group belonging to said second input field of said associated set of input fields.

4. The method of claim 3, wherein said generating step generates said frames in output groups of N output lines, N being an integer greater than one but much less than Q.

5. The method of claim 4, wherein M/N is substantially equal to P/Q.

6. The method of claim 4, wherein said generating step comprises the steps of:
storing successively received input groups in a temporary buffer;
generating another output group each time another input group is stored in said buffer such that each said output group is associated with a different said input group, each said output group being generated as a function of its associated said input group and input lines received prior to said associated input group and stored in a computational memory; and
storing those lines of each said input group which are required for the generation of an output group other than its associated output group in said computational memory during the same time interval during which its associated output group is being generated.

7. The method of claim 6, wherein each said received input group is stored in said temporary buffer only until its associated output group is generated and wherein said input lines stored in said computational memory are stored in said computational memory for a period of time approximately equal to the time it takes to generate an output field.

8. The method of claim 1, wherein P is greater than Q.

9. A method for converting an input video signal comprising a plurality of input frames, each input frame including P input lines, P being an integer much greater than one, into an output video signal comprising a plurality of output frames, each output frame including Q output lines, Q being an integer much greater than one but different than P, said input and output frames each being divided into odd and even fields, said method comprising the steps of:
receiving successive input groups of M input lines and storing each said input group in a temporary buffer, M being an integer greater than one but much less than P;
generating a respective output group of N output lines, N being an integer greater than one but much less than Q, each time another one of said input groups has been received and stored in said buffer such that each said output group is associated with a different said input group, each said output group being generated as a function of said input lines of its associated input group and input lines which were received prior to the receipt of said associated input group and which were stored in a computational memory; and
storing those of said input lines of each input groups which are required to generate output groups which are not associated with said input group in said computational memory during the same time interval during which said output group associated with said input group is being generated.

10. The method of claim 9, wherein the generation of each said output group is initiated substantially immediately after its associated input group has been stored in said temporary buffer.

11. The method of claim 10, wherein each said input group is removed from said temporary buffer after its associated output group has been generated.

12. The method of claim 9, wherein M/N is substantially equal to P/Q.

13. The method of claim 12, wherein P is greater than Q.

14. The method of claim 9, wherein each of said input lines are stored in said computational memory for a period of time substantially equal to the time it takes to generate a single output field.

15. Apparatus for converting an input video signal comprising a plurality of input frames, each said input frame including an odd field and an even field, each input frame having P input lines, P being an integer much greater than one, into an output video signal comprising a plurality of output frames, each said output frame includes an odd field an even field each output frame having Q output lines, Q being an integer much greater than one but different than P, said apparatus comprising:
means for receiving said input video signal; and
means for generating said output video signal utilizing substantially all of the video information contained in said video input signal, said generating means generating each said output field as a function of an associated set of first and second input fields and initiating the generation of each said output field after all of said first but before all of said second input fields of said associated set of input fields has been received.

16. Apparatus according to claim 15, wherein said generating means generates said output video signal utilizing a linear interpolation method wherein the video information contained in said input video signal is linearly distributed through-out said output video signal.

17. The apparatus of claim 15, wherein said receiving means comprises a temporary buffer which stores successive groups of input lines, each group containing M input lines and defining an input group, M being an integer greater than one but much less than P, and wherein said generating means initiates the generation of each said output field substantially immediately after the receipt of a first input group belonging to said second input field of said associated set of input fields.

18. The apparatus of claim 17, wherein said generating means generate said frames in output group of N output lines, N being an integer greater than one but much less than Q.

19. The apparatus of claim 18, wherein M/N is substantially equal to P/Q.

20. The apparatus of claim 18, wherein said generating means generates another output group each time another input group is stored in said buffer such that each said output group is associated with a different said input group, each said output group being generated as a function of its associated said input group and input lines received prior to said associated input group and stored in a computational memory; and
means for storing those lines of each said input group which are required for the generation of an output group other than its associated output group in said computational memory during the same time interval during which its associated output group is being generated.

21. The apparatus of claim 20, wherein each said received input group is stored in said temporary buffer only until its associated output group is generated and wherein said input lines stored in said computational memory are stored in said computational memory for a period of time approximately equal to the time it takes to generate an output field.

22. The apparatus of claim 15, wherein P is greater than Q.

23. Apparatus for converting an input video signal comprising a plurality of input frames, each input frame including P input lines, P being an integer much greater than one, into an output video signal comprising a plurality of output frames, each output frame including Q output lines, Q being an integer much greater than one but different than P, said input and said output frames each being divided into odd and even fields, said apparatus comprising:
  means for receiving successive input groups of M input lines and storing each said input group in a temporary buffer, M being an integer greater than one but much less than P;
  means for generating a respective output group of N output lines, N being an integer greater than one but much less than Q, each time another one of said input groups has been received and stored in said buffer such that each said output group is associated with a different said input group, each said output group being generated as a function of said input lines of said associated input group and input lines which will receive prior to the receipt of said associated input group and which were stored in a computational memory; and
  means for storing those input lines of each input group which are required to generate output groups which are not associated with said input group in said computational memory during the same time interval during which said output group associated with said input group is being generated.

24. The apparatus of claim 23, wherein said generating means initiates the generation of each said output group substantially immediately after its associated input group has been stored in said temporary buffer.

25. The apparatus of claim 24, wherein said generating means removes each said input group from said temporary buffer after its associated output group has been generated.

26. The apparatus of claim 23, wherein M/N is substantially equal to P/Q.

27. The apparatus of claim 26, wherein P is greater than Q.

28. The apparatus of claim 23, wherein each of said input lines are stored in said computational memory for a period of time substantially equal to the time it takes to generate a single output field.

29. Apparatus according to claim 23, wherein said generating means includes means for enabling a user of said apparatus to enter a desired conversion ratio which determines the number of said output lines Q in said output frames and wherein said generating means generates said output signal as a function of said desired ratio.

30. Apparatus according to claim 29, wherein said generating means generates said output video signal as a function of a series of equations relating a group of said input lines M in number, M being an integer greater than one but much less than P to a group of said output lines N in number, N being an integer greater than one but much less than Q, M/N being the conversion ratio entered by said user.

31. Apparatus according to claim 29, wherein said generating means includes:
  conversion circuit means for generating said output video signal as a function of said received input video signal in response to control signals applied thereto; and
  control circuit means for generating said control signals as a function of said entered conversion ratio.

* * * * *